US012578212B2

(12) United States Patent
Brown et al.

(10) Patent No.: US 12,578,212 B2
(45) Date of Patent: Mar. 17, 2026

(54) UNIVERSAL INSTRUMENT ENVIRONMENTAL SHIELD

(71) Applicant: Angus Measurement Services, LP, Odessa, TX (US)

(72) Inventors: Erik J. Brown, Cushing, OK (US); Douglas L. Griffin, Odessa, TX (US)

(73) Assignee: Angus Measurement Services, LP, Odessa, TX (US)

( * ) Notice: Subject to any disclaimer, the term of this patent is extended or adjusted under 35 U.S.C. 154(b) by 0 days.

(21) Appl. No.: 19/217,844

(22) Filed: May 23, 2025

(65) Prior Publication Data

US 2025/0362159 A1 Nov. 27, 2025

Related U.S. Application Data

(60) Provisional application No. 63/651,982, filed on May 25, 2024.

(51) Int. Cl.
*G01D 11/24* (2006.01)
(52) U.S. Cl.
CPC ................................... *G01D 11/245* (2013.01)
(58) Field of Classification Search
CPC ..................................................... G01D 11/245
See application file for complete search history.

(56) References Cited

U.S. PATENT DOCUMENTS 4,212,262 A 7/1980 Gorrell
2016/0084694 A1 3/2016 Cole

FOREIGN PATENT DOCUMENTS

| CN | 101545793 | B | * | 4/2012 | ............. | G01F 23/00 |
|----|-----------|---|---|--------|--------------|------------|
| CN | 203014961 | U |   | 6/2013 | | |
| CN | 209800095 | U |   | 12/2019 | | |
| CN | 110987110 | A |   | 4/2020 | | |
| CN | 212747933 | U |   | 3/2021 | | |
| CN | 112629573 |   |   | 4/2021 | | |
| CN | 218765450 | U |   | 3/2023 | | |
| EP | 2320400 |   |   | 5/2011 | | |
| GB | 2223133 | A |   | 3/1990 | | |
| KR | 100783600 | B1 |   | 12/2007 | | |

(Continued)

OTHER PUBLICATIONS

Ebay, "8" Poly Yellow Traffic Light Visor for McCain Traffic Lights Cap Style Nos", <URL: https://www.ebay.ca/itm/166307659790>, 2 pages.

(Continued)

*Primary Examiner* — Jamel E Williams
(74) *Attorney, Agent, or Firm* — Sheppard Mullin Richter & Hampton LLP

(57) ABSTRACT

Devices and methods are provided for adaptable protective covers having adaptable applicability to a different measurement instruments. Examples include a housing element having a body that at least partially surrounding an opening along a central axis and extending in a direction approximately parallel to the central axis, a cover plate attached to the housing element that is configured to at least partially cover the opening, and an attachment mechanism disposed on the body of the housing element. The attachment mechanism can provide adaptability for attaching the housing element any one of a plurality of measurement instruments of differing dimensions and sizes.

23 Claims, 18 Drawing Sheets

(56)     References Cited

FOREIGN PATENT DOCUMENTS

| | | | | |
|---|---|---|---|---|
| KR | 102719380 B1 * | 10/2024 | ............ | G01F 23/00 |
| WO | 2011030920 A1 | 3/2011 | | |

OTHER PUBLICATIONS

Kankin Mart, "Kankin Waterproof Socket Cover Universal Panel Cover Box Protector", <URL: https://www.amazon.in/kankin-Waterproof-Universal-Protector-Transparent/dp/B0CBPBM36P>, 5 pages.

* cited by examiner

UNIVERSAL INSTRUMENT ENVIRONMENTAL SHIELD

CROSS-REFERENCE TO RELATED APPLICATION

This application claims priority to U.S. Provisional Patent Application No. 63/651,982, filed May 25, 2024, entitled "UNIVERSAL INSTRUMENT ENVIRONMENTAL SHIELD", which is hereby incorporated herein by reference in its entirety.

BACKGROUND

Instrumentation refers to measuring instruments that can be used for indicating, measuring, and recording physical quantities (also referred to as variables) of operations and processes. Instrumentation can refer to devices as simple as direct-reading thermometers, or as complex as multi-sensor components of industrial control systems. Instruments can be found in laboratories, refineries, factories and vehicles, as well as in everyday household use (e.g., smoke detectors and thermostats).

Industrial instrumentation can provide real-time data on process variables that enable automation technologies, such as process and/or factory automation, to optimize operations and improve operations. Industrial instrumentations can use various field level instrumentations, such as sensors, transmitters, process variable meters, and other devices to measure, record, and control process variables, such as, but not limited to, pressure, temperature, flow, level, moisture, density, viscosity, frequency, current, voltage, vibration, and weight, among numerous others. Example instruments include, but are not limited to, fill level measuring devices, flow meters, pressure and temperature measuring devices, pH-redox potential measuring devices, conductivity measuring devices, etc.

The measurement and control of process variables through the field level instrumentations can be leveraged to provide benefits to manufacturing processes, including enhanced efficiency and accuracy. Industrial instrumentation, in one example, is used in oil and gas industry. In this context, pressure and flow rates can be measured and monitored using the industrial instrumentation during drilling and production. The sensors and transmitters can continuously measure the process variables, which operators use to ensure the safety and efficiency of operations. In another example, the food and beverage industry can utilize industrial instrumentation to control temperature, which can be impact product quality. Industrial instrumentation can be used, in this case, to monitor and control the temperature in real time.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1A:
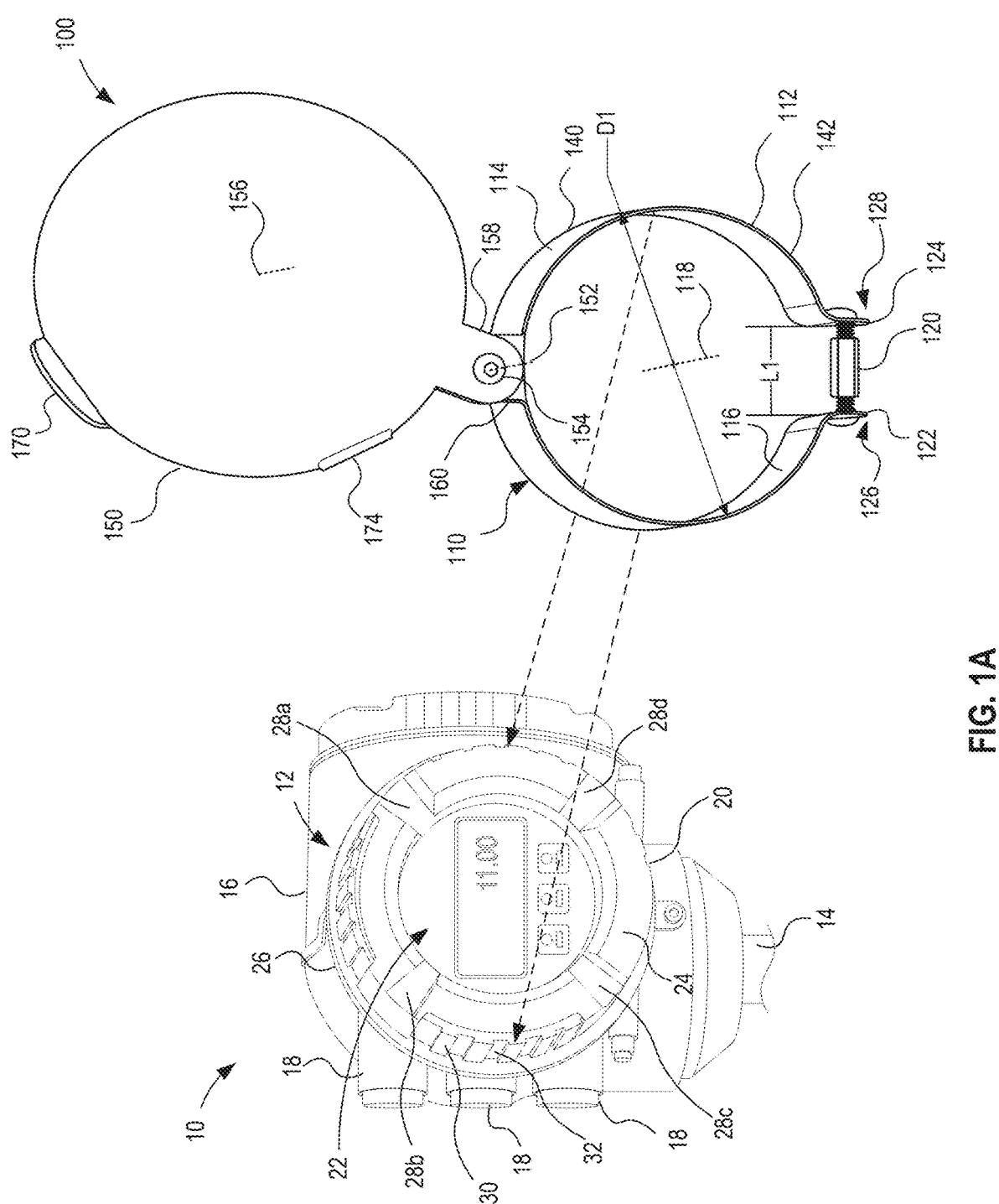
FIGS. 1A-1G depict an example of an adaptable protective cover, in accordance with an embodiment of the present disclosure.

The figures are not exhaustive and do not limit the present disclosure to the precise form disclosed.

DETAILED DESCRIPTION

As alluded to above, field level instruments can be used to provide real-time measuring, recording, and control of process variables from within an environment in which the process variable is used. Field level devices can be used in close proximity to the process using the variable being measured, recorded, and/or controlled. For example, a flow meter can be deployed in the field such that the flow meter can measure fluid flows in a pipe, which can be used to control actuators to adjust flows to improve operations. This flow meter may deployed in close proximity (e.g., same environment) as the pipe for which the fluid flow is monitored by the instrumentation. Beneficially, field level instruments can be provide real-time monitoring and control of process.

However, these field level instruments can be exposed to real, natural environmental conditions, which can be detrimental to the field level instruments themselves. For example, field level instruments can include local operator interfaces (LOI), such as integral displays or touch screens, which can be obscured by sun light. As another example, particulate matter, such as dust, dirt, soot, smoke, etc., can be present in a field environment due to industrial processes in the vicinity, which can damage and/otherwise impact operations of the instrumentation. In yet another example, rain or other liquid droplets can seep onto the instrument's display, which can cause malfunction or otherwise impair the reliability of the instrument.

Furthermore, instrumentations can vary in size, shape, and dimensions. In some cases, instruments can vary depending on the type of instrumentation (e.g., flow meter vs. a pressure and temperature meter). Instruments can also vary depending on manufacturer. In other cases, instruments of the same type can vary between models from a single manufacturer, such as a budget model compared to a more advanced, complex model.

Conventionally, due to the varying sizes, shapes and dimensions, protective covers have been provided to protect an instrument from environmental conditions, but are designed for a specific instrument model and manufacturer. The conventional covers generally include specifically designed mechanisms to attach or otherwise interface with a specific instrument for which the cover is designed. For example, a cover may include interfacing pegs that can be inserted into holes designed in the instrument for attaching the cover to the specific instrument. In this case, the cover must have a specifically designed size and specifically positioned pegs to fixedly interlock with the instrument. Thus, another instrument with different dimensions would require a completely different cover having pegs and shaped according to the other instrument. These individually designed protective covers create high costs for manufactures in the design, production, and storage of these many different protective housings. Furthermore, the individually designed covers create costs for instrument operator in the purchase of the individual different covers, even when one instrument becomes technologically obsolete but the cover cannot be used with a new instrument.

Accordingly, embodiments disclosed herein provide for adaptable protective cover that can be used for a plurality of different instruments. The embodiments disclosed herein provide for universal or at least near universal applicability to a variety of instruments. In various embodiments disclosed herein, the adaptable protective cover comprises a housing element that is configured to attach to an outer perimeter of an instrument. The housing element can comprise an attachment mechanism that can be adapted for number of different perimeter dimensions and/or shapes. The housing element may be configured to at least partially surround the outer perimeter of an instrument.

Examples herein may provide adaptable protective covers that are universal adaptable for various shapes and sizes of instruments. For example, the configurations of the housing cover and attachment mechanism can adapted to any desired instrument with minimal redesign. For example, the housing element, protective covers, and attachment mechanism can be easily modified, for example, during manufacture, to fit and attach to any instrument. Thus, manufacturing processes need not be altered and parts need not be significantly redesigned to be applicable to different instruments, thereby providing universal applicability. Furthermore, the instruments themselves do not need to be altered in order to interlock or otherwise attach to the embodiments disclosed herein.

In some examples, the housing element may be a deformable housing element having a sizing that can be changed, for example, by the attachment mechanism. In this case, the attachment mechanism may be referred to as a deforming device. The deforming device can be utilized to change a width of the housing element. By changing the width, the housing element can clamp on the outer perimeter of the instrument, thereby affixing the housing element to the outer perimeter using a friction fit between an inner surface of the housing element and the outer perimeter of the instrument. Thus, the housing element can be held stationary relative to the instrument once attached thereto. Accordingly, by changing the width of the housing element, the protective cover can be configured to affix to wide variety of instruments. Furthermore, by using an adjustable clamping action that provides for a friction fit with the outer perimeter of the instrument, attachment mechanisms specifically designed for specific instruments are unnecessary, thereby providing widespread applicability to instruments independent of instrument type, manufacturer or model.

Examples herein may provide adaptable protective covers that are universal for given shape and a range of dimensions. The housing element, according to various embodiments, may have a shape that corresponds to the shape of the instrument. For example, the housing element may have a tubular body having a cylindrical housing and an axial opening having a width (e.g., diameter in this example) that can be adapted to a variety of instruments. In this case, an instrument can be inserted (e.g., received) in the axial opening. In an initial configuration, in which the deformable housing element has a maximum width (e.g., maximum diameter), the diameter is larger than the largest width of outer perimeter of the instrument. The deforming device can be used to reduce the diameter to a size that clamps (e.g., contacts and holds tightly against vis friction fit) to the outer perimeter of the instrument. Thus, the housing element can be adjusted to attach to any instrument having a shape that fits within (e.g., less than) the axial opening having the maximum width.

The adaptable protective cover, according to various embodiments, comprises a rotatable cover plate configured to rotate about a pivot axis. The rotatable cover plate can be rotated between a first configuration (also referred to as an open or unprotected configuration), in which the interface region is uncovered and at least partially exposed to environmental conditions, to a second configuration (also referred to as a closed or protective configuration), in which the rotatable cover plate covers an interface region of the instrument. While in the second configuration, the rotatable cover plate can protect the instrument, and more particularly the interface region, from environmental conditions. In various examples, the cover plate, either alone or in combination with the housing element, can fully encompass the interface region of the instrument to provide 360 degrees of protection from environmental conditions.

Embodiments disclosed herein do not interfere with the operation of and/or original design elements of the covered instruments. For example, the adaptable protective covers disclosed herein are designed to protect the instrument from environmental conditions, such as but not limited to liquid droplets, sunlight, particulate matter, etc., by being externally mounted to the instrument. For example, examples disclosed herein can minimize exposure of the instrument's displays to these external elements. Accordingly, the disclosed embodiments do not encroach on an internal closure space of the instruments in which the internal circuitry and systems of the instrument are contained.

As used herein "approximately" and "generally" refer to manufacturing tolerances of permissible variations in physical properties of the embodiments disclosed herein. Dimensions, orientations, and/or configurations disclosed herein may have some acceptable variation withing manufacturing tolerances without significantly affecting functioning of the disclosed embodiments. For example, while parallel and perpendicular relative arrangements and directions may be ideal, such configurations may not be perfectly achievable. Thus, approximately perpendicular and the like refers to a relative orientation or configuration within manufacturing tolerances. Similarly, generally linear and the like refers to a configuration within manufacturing tolerances.

Figures 1B, 1C:
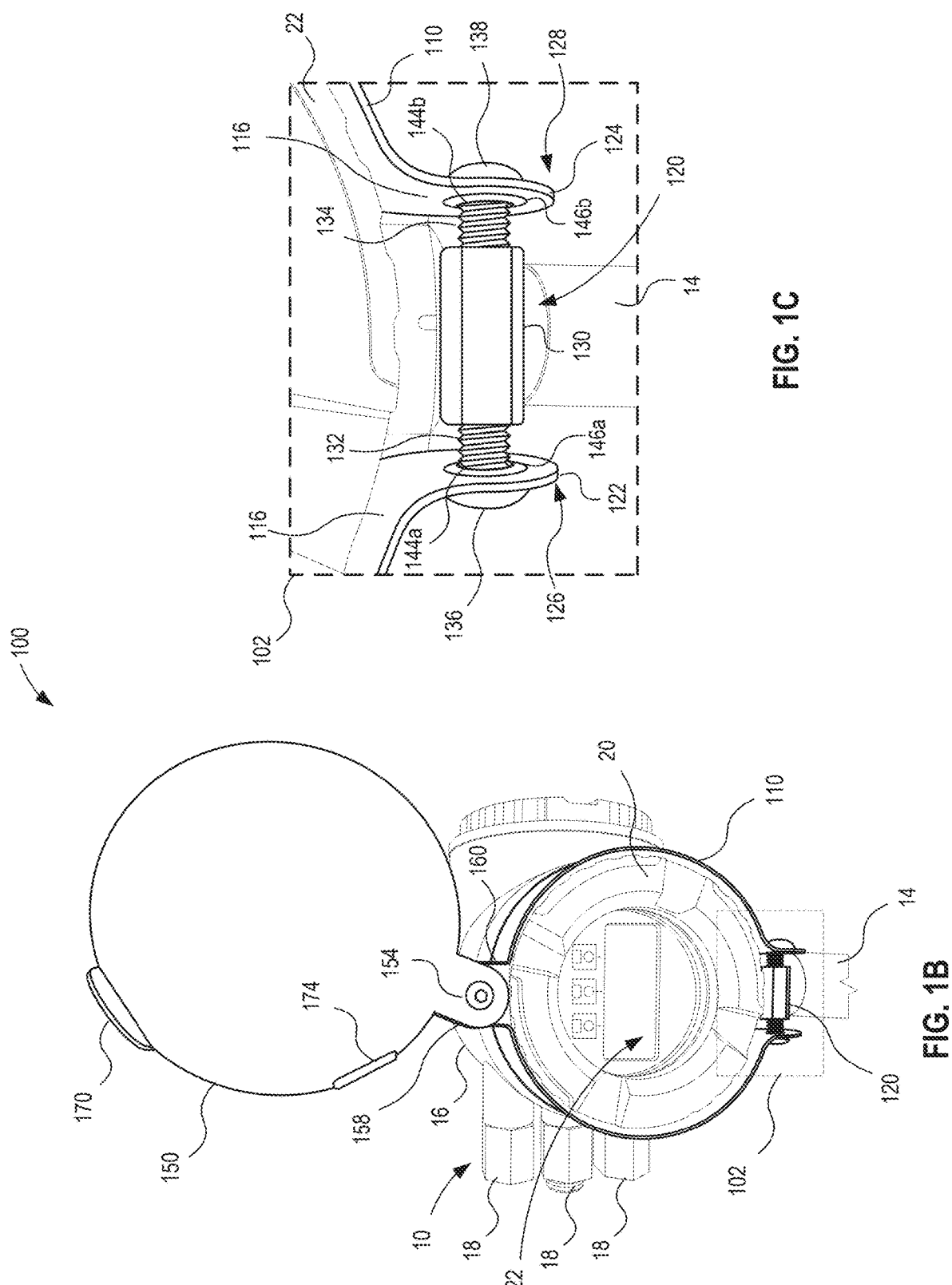
Figure 1E:
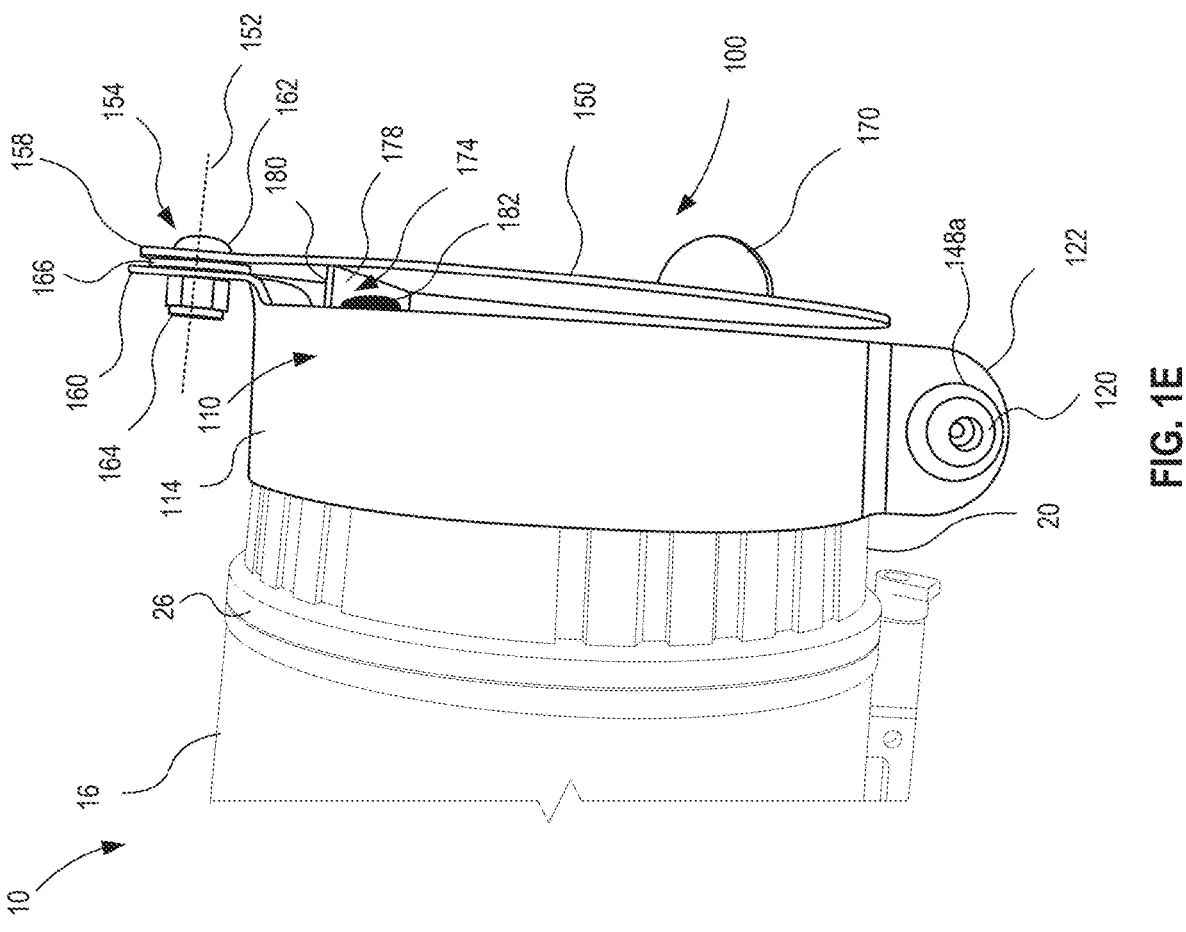
Figure 1D:
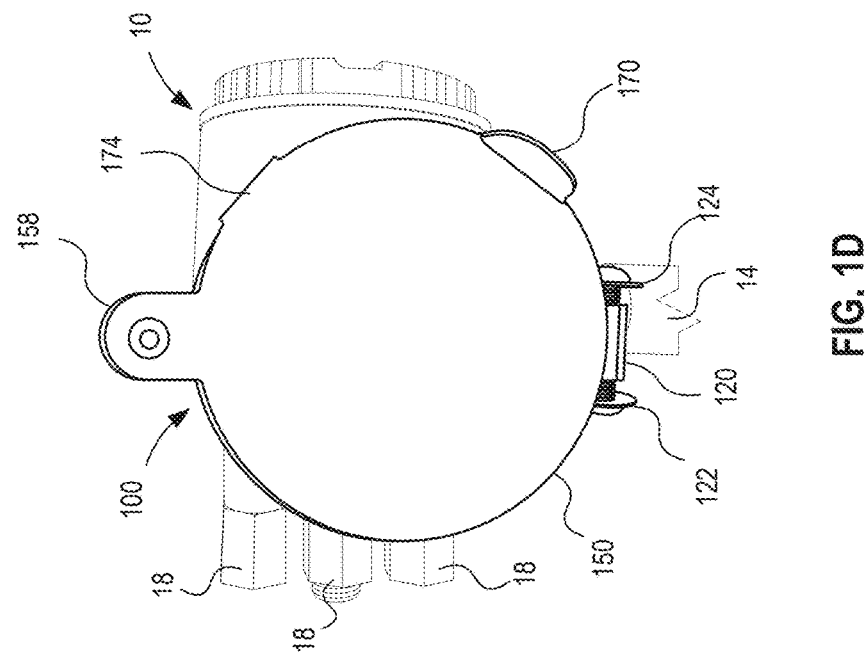

FIGS. 1A-1G depict an example of an adaptable protective cover 100, in accordance with an embodiment of the present disclosure. FIG. 1A depicts an exploded view of the adaptable protective cover 100, in a first configuration (e.g., open or unprotected configuration), that can be employed to cover measurement instrument 10. FIG. 1B is a front view of the adaptable protective cover 100 attached to the measurement instrument 10 in the first configuration and FIG. 1C is a zoomed in view of a region 102 shown in FIG. 1B. FIG. 1C depicts the adaptable protective cover 100 attached to the measurement instrument 10 and in a second configuration (e.g., closed or protected configuration). FIGS. 1D and 1E are side views of the adaptable protective cover 100 attached to the measurement instrument 10.

In the example of FIGS. 1A-1F, measurement instrument 10 comprises an integral mount transmitter 12 provided at an end of pipe section 14. In some examples, the measurement instrument 10 may comprise a sensor housing 34 (shown in FIG. 3A) attached to the pipe section 14 opposite the transmitter 12. The sensor housing may comprises sensor components, such as, for example, coils, electrodes, and the like. The transmitter, in this example, can comprise a transmitter housing 16 that houses electronics boards (such as, for example, a controller or computation systems comprising processors and memories) for receiving sensor data of process variables from the sensor components and performing operations of the measurement instrument 10 based on the sensor data. Transmitter 12, in this example, comprises conduit connection 18 for connecting transmitter 12 to power supply (PS) and process control unit (PCU), among other external devices. Power supply may comprise an AC (line) or DC power supply, or both.

Measurement instrument 10 also comprises a front cover 20 and a local operator interface (LOI) 22. LOI 22 comprises an interactive visual display for local control and communications with transmitter 12. In some embodiments, LOI 22 can include menu-based navigational keys to enter installation data and configuration parameters, run test modes, and access other transmitter functions. Front cover 20 and housing 16 may can be attached forming a cavity in which the electronics boards, controllers, and other circuitry of the transmitter 12 can be housed for providing functionality of measurement instrument 10.

In the example of FIGS. 1A-1F, front cover 20 comprises a generally cylindrical shaped body extending along a central axis between an front surface 24 and a rear surface 26 that interfaces with the housing 16. Front cover 20 comprises notches 28a-28d that recess from the front surface 24 in a direction along the central axis toward to the rear surface 26. In this example, front cover 20 also comprises a plurality of teeth disposed radially around an outer surface of front cover 20. Front cover 20, in this example, comprises a outermost surface 30 and a plurality of teeth 32 that are recessed radially toward the central axis from the outermost surface 30.

In the example of FIGS. 1A-1F, LOI 22 is surrounded in a radial direction by and held in position by the front cover 20. As used herein, the "radial direction" refers to a direction pointing along a radius from a center of an object, or perpendicular to a curved path. In other words, for example, LOI 22 is surrounded in a direction along a radius of the cylindrical body of front cover 20. While the edges of the LOI 22 may be covered by front cover 20, as shown in FIG. 1A, the display interactive visual display for local control and menu-based navigational keys (if any) remain exposed and uncovered by the components of measurement instrument 10.

Absent the embodiments disclosed herein, the LOI 22 may be exposed to environmental conditions of an environment in which measurement instrument 10 is implemented. For example, particulate matter and liquid droplets may be incident upon LOI 22, which may be detrimental to the operations of measurement instrument 10. Sunlight may also be incident on LOI 22, which may obscure the interactive visual display used by an operator. In some cases, condensation may cause moisture to develop within the display of LOI 22, which can cause malfunctions. In an illustrative example, a display of the LOI 22 can become permanently damaged due to exposure to excessive sunlight. For example, excessive sunlight can cause the display to be under or oversaturated, create streaks in the display, etc., which can render the display, and by extension transmitter 12, mostly or completely unusable. Similarly, particulates in the environment, either solids or liquids may penetrate the seams or edges of the transmitter 12 (e.g., where the front cover 20 meets the LOI 22 and/or housing 16). These particulates can cause malfunctions in the internal circuitry of the transmitter 12.

Accordingly, adaptable protective cover 100 in the example of FIGS. 1A-1F can be used to protect the transmitter 12, such as the LOI 22, from environmental conditions. Adaptable protective cover 100 comprises a housing element 110 that is configured to affix to the perimeter of outermost surface 30 of the measurement instrument 10. The adaptable protective cover 100 may comprise a continuous body 112 that extends from end 122 to end 124. For example, as shown in FIGS. 1A-1F, the body 112 is provided as a single sheet of material that extends uninterrupted from end 122 to end 124. In another example, the body 112 may be provided as interlocked components that collectively provided an uninterrupted body extending from mend 122 to end 124.

Figure 1F:
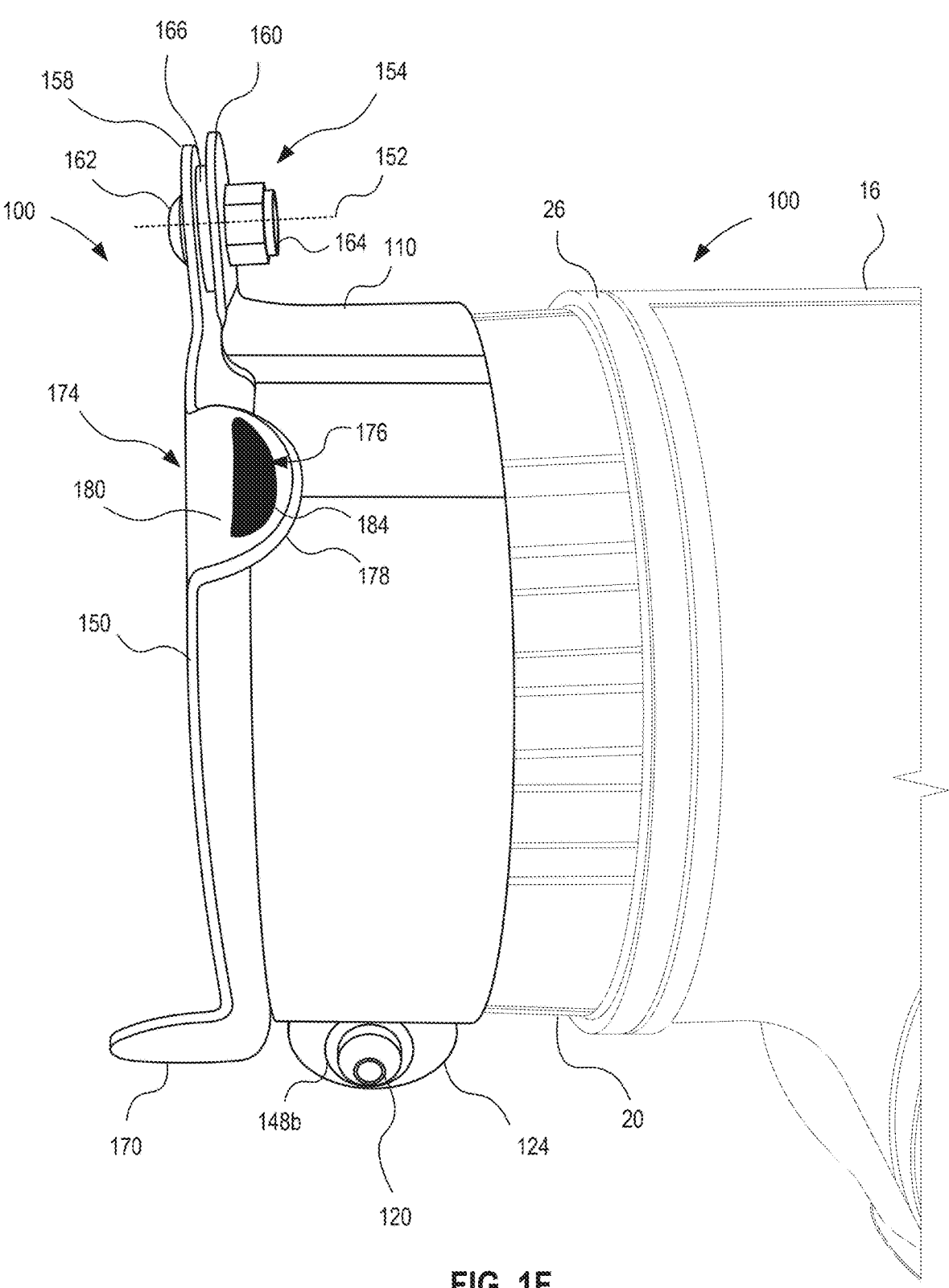

The housing element 110 may be configured to at least partially surround the front cover 20 of an instrument. For example, in the example of FIGS. 1A-1F, housing element 110 may comprise a body 112 having a generally a tubular shape with a cylindrical outer surface 114 and a cylindrical inner surface 116 extending between a front edge 142 and a rear edge 140, with an opening along a central axis 118. The inner surface 116 may have a width D1 (e.g., inner diameter D1 in this example) that represents the largest width of the inner surface. In various examples, housing element 110 may be formed as a sheet of material having that is bent around central axis 118 to form a cylindrical body. The sheet may have a rectangular (e.g., rounded rectangular shape in this example) that is bent to form the housing element 110. Ends 126 and 128 are further bent in an opposite direction as the body to form first coupling member 122 and second coupling member 124, as shown in FIGS. 1A and 1F. The housing element 110 may be formed from materials, such as metal, plastics, or other materials as desired. For example, the housing element 110 may be made of any solid material including metals, composites including plastics as well as any type of UV blocking and impact resistant or shatter proof opaque, translucent or transparent material.

The housing element 110, in various examples, may be a deformable housing element having a sizing that can be changed, for example, by a deforming device 120 (e.g., an example implementation of an attachment device) coupled to the housing element 110. The deforming device 120 can be utilized to change the width D1 of the housing element 110. By changing the width, the housing element 110 can clamp on the front cover 20 of the measurement instrument 10, in this example, thereby affixing the adaptable protective cover 100 to measurement instrument 10 using a friction fit between an inner surface 116 of the housing element 110 and the front cover 20 of the measurement instrument 10. Thus, the adaptable protective cover 100 can be held stationary relative to the measurement instrument 10 once attached thereto. Accordingly, by changing the width of the housing element 110, the adaptable protective cover 100 can be adaptable to a wide variety of instruments having different sizes and shapes. Thus, adaptable protective cover 100 need not be specific to a given instrument, such as measurement instrument 10 shown in FIGS. 1A-1F. Furthermore, by using an adjustable clamping action that provides for the friction fit, attachment mechanisms specifically designed for a specific instrument are unnecessary, thereby providing widespread applicability to numerous instruments independent of instrument type, manufacturer or model.

In the illustrative example of FIGS. 1A-1F, deforming device 120 can be coupled to the housing element 110 via a first coupling member 122 and a second coupling member 124. First and second coupling members 122 and 124 maybe protrusions at a first and second ends 126 and 128 of the adaptable protective cover 100, respectively. The deforming device 120 can be a compression style hardware set coupled to the inner surface 116 of each of first coupling member 122 and second coupling member 124 that can be utilized to change a distance L1 between the first coupling member 122 and second coupling member 124. For example, as shown in FIG. 1C in region 102, deforming device 120 may be provided as a threaded couple 130 and a pair of threaded fasteners 132 and 134 (e.g., threaded bolts or screws) having heads 136 and 138, respectively. First coupling member 122 and second coupling member 124 may each have a through hole 144a and 144b, respectively, into which threaded fastener 132 and threaded fastener 134 can be inserted, respectively. Washers may be provided, in some examples, on both sides of each first coupling member 122 and 124. For example, as shown in FIGS. 1C, washers 146a and 146b may be aligned with through holes 144a and 144b, respectively, and the threaded fasteners 132 and 134 may be inserted therein, respectively. The threaded fastener 132 and threaded fastener 134 can be inserted into opposing ends of threaded couple 130 and heads 136 and 138 may rest on the outer surface 114 of housing element 110, thereby restraining deforming device 120 between first coupling member 122 and second coupling member 124. In some examples, washers 148a and 148b, as shown in FIGS. 1E and 1F, may be positioned between the heads 136 and 138 on the outer surface 114 aligned with the through holes 144a and 144b, respectively, such that the heads 136 and 138 may rest on a respective washer. The washers 146a, 146b, 148a, and 148b may be provided, for example, as a non-metallic material (e.g., plastic such as PTFE, rubber, or the like, as well as coated metal washers coated with a material to prevent seizure) or other material that permits a surfaces to slide relative to each other without seizing (e.g., due to rust and/or excessive friction). Operating threaded couple 130, for example, by rotating threaded couple 130 in a first direction relative to housing element 110 can bring threaded fastener 132 and threaded fastener 134 closer together, which causes head 136 and head 138 to pull the first coupling member 122 and second coupling member 124 closer together and reduces the distance L1. Reducing the distance L1 causes the width D1 (e.g., the diameter) to decrease in size by deforming the housing element 110 (e.g., changing the sizing of housing element 110). In another example, operating threaded couple 130, for example, by rotating threaded couple 130 in a second direction relative to housing element 110 can bring threaded fastener 132 and threaded fastener 134 further apart, which causes head 136 and head 138 to release the first coupling member 122 and second coupling member 124. The release of force, permits the distance L1 to increase, thereby increasing the width D1 of housing element 110.

While an example implementation of deforming device 120 is provided herein, embodiments disclosed herein are not intended to be limited to this example. Deforming device 120 may be implemented as any device capable of adjusting the width/diameter of the housing element 110. For example, deforming device 120 may be implemented as various types of latches, such as but not limited to, a pull clamp, toggle and butterfly latches, a bolt and nut configuration, etc. Deforming device 120 may be provided as any device that can draw the two ends 126 and 128 (e.g., coupling members 122 and 124) together to provide tension so to attach the housing element 110 to the transmitter 12.

In the example of FIGS. 1A-1F, deforming device 120 can be used to adjust the width D1 to provide a compression induced friction fit between inner surface 116 and outermost surface 30 of measurement instrument 10, which affixes the adaptable protective cover 100 to measurement instrument 10. For example, at an initial state, width D1 of housing element 110 is at its largest in which deforming device 120 is fully released providing a largest distance L1. Housing element 110 can then be placed so to surround outermost surface 30 of measurement instrument 10 in the radial direction and deforming device 120 can be operated to reduce the length L1 until the inner surface 116 is compressed against the outermost surface 30. While the example of FIGS. 1A-1F is provided with reference to a specific measurement instrument 10, this is for illustrative purposes only. The housing element 110 can be adapted for number of different instruments having varying shapes and dimensions. For example, housing element 110 can be deformed to affix to instruments having an outer perimeter having the largest width that is less than or equal to the largest width of the housing element 110 (e.g., uncompressed or initial state of housing element 110). In some examples, the outer perimeter of an instrument may be at least larger than a smallest width D1 (e.g., a state at which distance L1 is at a minimum). While measurement instrument 10 is shown having a generally cylindrical shaped front cover 20, embodiments disclosed herein are not limited thereto. Housing element 110 can be considered to have a shape corresponding to that of the measurement instrument 10 when at least the measurement instrument 10 (e.g., front cover 20) contacts the inner surface 116 at least two points of contact. For example, in the example of FIGS. 1A-1F, numerous points of contact are made between outermost surface 30 and inner surface 116. In another example, an instrument may have a rectangular shaped cover making four points of contact (e.g., at the corners of the cover). The rectangular shaped cover may be considered as corresponding to the housing element 110 because housing element 110 can be attached thereto via friction fit at the corners. Thus near universal applicability of housing element 110 can be achieved.

The adaptable protective cover 100, according to various embodiments, also comprises a rotatable cover plate 150 configured to rotate about a pivot axis 152. In the example of adaptable protective cover 100, pivot axis 152 may be approximately parallel to central axis 118. The rotatable cover plate 150 may be provided as a planar sheet of material having a generally circular profile having a central axis 156 and thickness along the direction of central axis 156, in this example. A protrusion 158 can be formed extending in a radial direction from the central axis 156. A corresponding protrusion 160 can be formed on the housing element 110, which may extend in a radial direction from central axis 118. In an example, protrusion 160 can be formed planar with the body of housing element 110 and then bent in a direction to extend radially from central axis 118 and toward rotatable cover plate 150.

As shown in the examples of FIGS. 1A-1F, adaptable protective cover 100 comprises a joint 154 provided along the pivot axis 152 and coupled to protrusion 158 and protrusion 160. Protrusion 158 and protrusion 160 may each comprise a through hole (shown in FIG. 6A as through hole 168 in protrusion 160) provided along pivot axis 152 and configured to receive joint 154. The joint 154 may be implemented as a pivot joint, hinge joint, or the like. Joint 154 may comprise a slidable surface that permits rotatable cover plate 150 to rotate about pivot axis 152 relative to housing element 110. For example, rotatable cover plate 150 can be rotated about pivot axis 152, which moves central axis 156 relative to central axis 118. Accordingly, rotatable cover plate 150 can be rotated between a first configuration (e.g., as shown in FIGS. 1A and 1E), in which central axis 156 and central axis 118 are spaced apart, and a second configuration (e.g., as shown in FIGS. 1B-1D), in which central axis 156 and central axis 118 are approximately aligned. In the first configuration, the LOI 22 is uncovered and may be exposed to environmental conditions, while in the second configuration the rotatable cover plate 150 covers measurement instrument 10. While in the second configuration, the rotatable cover plate 150 can protect the measurement instrument 10, for example, LOI 22, from environmental conditions. In various examples, the rotatable cover plate 150, either alone or in combination with the housing element 110, can fully encompass the front cover 20 and LOI 22 to provide 360 degrees of protection from environmental conditions.

The joint 154, according to various example, may be a mechanism that holds protrusion 158 and protrusion 160 along pivot axis 152 while enabling rotatable cover plate 150 to rotate about pivot axis 152. In an illustrative example joint 154 may comprise a bolted joint 162 that is secured by a nut 164. As shown in FIGS. 1D and 1E, a spacer washer 166 may be disposed between protrusion 160 and protrusion 158 to permit rotation therebetween. Spacer washer 166 may be provided, for example, as a non-metallic material (e.g., plastic such as PTFE, rubber, or the like, as well as coated metal washers coated with a material to prevent seizure) or other material that permits a surface of protrusion 158 to slidably rotate without seizing (e.g., due to rust and/or excessive friction), for example, between protrusion 160 and protrusion 158 or between protrusion 158 and a metallic washer. In some examples, the body of the bolted joint 162 may be inserted in a sleeve that is disposed along pivot axis 152 within the through holes of protrusion 160 and protrusion 158. The sleeve may have be formed of a materials having an outer surface that permits a surface of the through holes to slide, thereby permitting rotation without seizing against the bolted joint 162.

Rotatable cover plate 150 according to various examples may also comprise one or more operation members that are operable to manipulate the rotatable cover plate 150. In the example of adaptable protective cover 100, rotatable cover plate 150 comprises a first operation member 170 that may be adapted as an operator interface. First operation member 170 (also referred to as an operator interface) may function as a handle that a local operator may interface with to rotate rotatable cover plate 150 between the first and second configurations. In the example of adaptable protective cover 100, first operation member 170 may be tab formed into the sheet of material forming rotatable cover plate 150 that may be bent in a direction opposite of housing element 110. In this case, first operation member 170 is illustratively provided as a semicircular tab that a user may grasp or otherwise interact with to induce rotation of rotatable cover plate 150. In some examples, first operation member 170 may be coated with or otherwise comprise a high friction surface, for example, powder coated enamel, rubber, foam, or other material that an operator may grasp.

Figure 1G:
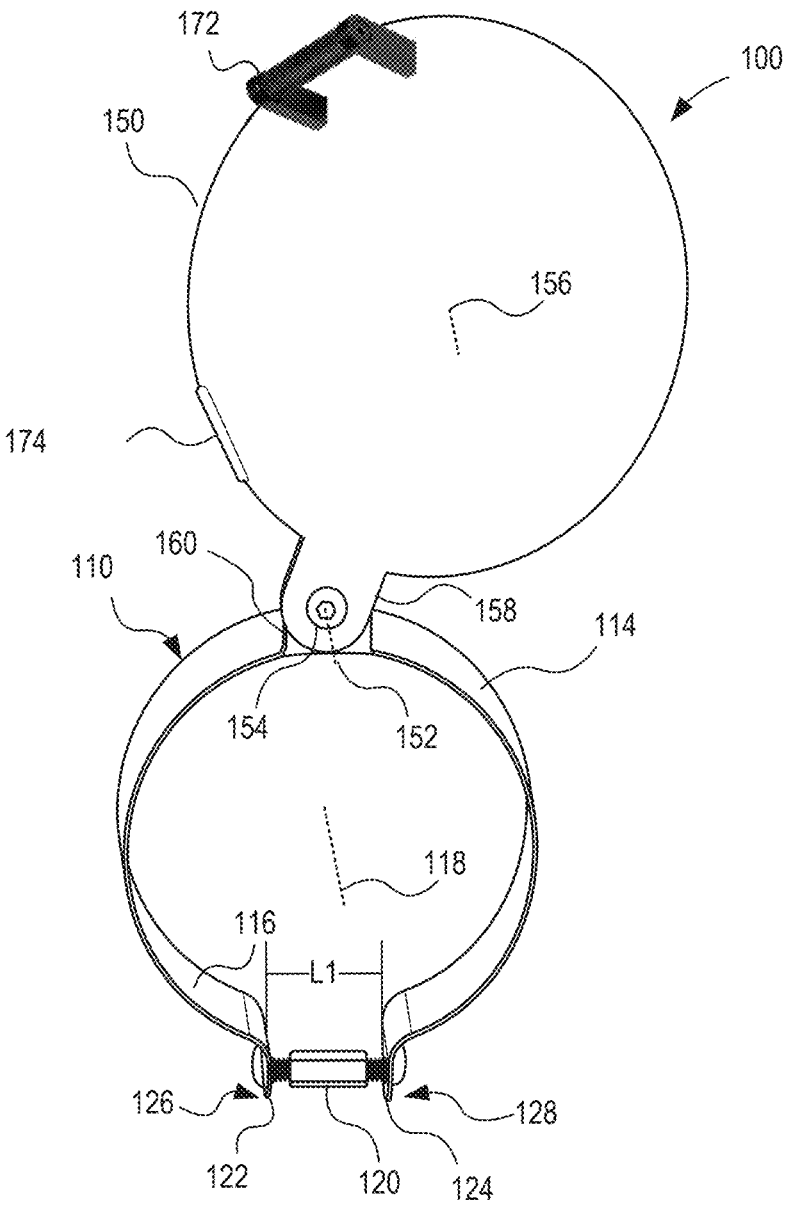

First operation member 170, in this example, is formed at a position of the outer perimeter of rotatable cover plate 150 offset from a point directly opposite of protrusion 158, which may enable efficient and ease of rotation about pivot axis 152. However, first operation member 170 may be position at any position desired, for example, at a position directly opposite of protrusion 158. In another example, first operation member 170 need not be located at the perimeter of rotatable cover plate 150. For example, FIG. 1G depicts an embodiment of adaptable protective cover 100 comprising a handle 172 as an example implementation. As another example, handle 172 may be implemented as s rod that can be grasped by an operator. In some cases, handle 172 may be rotatable relative to rotatable cover plate 150 to permit grasping of the handle (e.g., a rod or other revolving handle) and rotating of rotatable cover plate 150 without having to readjust a grip of the operator.

Rotatable cover plate 150, according to the examples of FIGS. 1A-1G, comprises a second operation member 174 that may utilized as a stopper to constrain rotation of rotatable cover plate 150 about pivot axis 152. Second operation member 174 may be used, for example, to restrain rotatable cover plate 150 from rotating a full 360 degrees and hold the rotatable cover plate 150 in an open configuration (e.g., first configuration). For example, second operation member 174 may be provide as a protruding tab that extends in a direction approximately parallel to central axis 156 and toward the housing element 110 (e.g., a direction opposite of first operation member 170). Second operation member 174 may extend a distance from rotatable cover plate 150 to overlap with the body of housing element 110 along a direction approximately parallel with the central axis 118. In other words, as depicted in FIG. 1F, a portion 176 of second operation member 174 overlaps with the housing element 110 such that a surface 178 of second operation member 174 contacts outer surface 114 while adaptable protective cover 100 is in the closed configuration (e.g., second configuration). This contact can function to hold rotatable cover plate 150 in the second configuration and constrain rotatable cover plate 150 from rotating further, which may result in uncovering the measurement instrument 10. In the open configuration (e.g., first configuration), surface 180 of second operation member 174 can contact outer surface 114, which can constrain rotatable cover plate 150 from rotating further and constraining rotatable cover plate 150 in the open configuration. An illustrative example of this is provided in FIG. 2C. Thus, rotatable cover plate 150 may not rotate further and transition to the closed configuration, thereby permitting a local operator to access transmitter 12, e.g., LOI 22, without having to hold rotatable cover plate 150 in an open configuration. In some examples, second operation member 174 may be formed as a tab protruding from a sheet of material used to form rotatable cover plate 150. This tab may be bent in a direction to overlap with the housing element 110 as shown. In another example, second operation member 174 may be a separate component that is attached or otherwise adhered to rotatable cover plate 150.

By integrally forming the operation members as part of rotatable cover plate 150, rotatable cover plate 150 can be formed from a single piece of material and manufactured with efficiency and simplicity. Furthermore, due to the nature of adaptable protective cover 100, the size and location of the cover plate 150 and operation members can be infinitely adjustable at manufacture so to be adaptable to any device or instrument. Similarly, the configurations of the housing element 110 and deforming device 120 can be adaptable, for example, during manufacture, to be easily and efficiently adaptable to any instrument. Thus, manufacturing processes need not be altered and parts need not be redesigned to be applicable to different instruments, thereby providing universal applicability.

In some embodiments, second operation member 174 may comprise a padded member 182 attached thereto, as shown in FIG. 1E. The padded member 182 may be provided as a rubber, foam, or other material to provide a padded or cushioned surface that contacts outer surface 114.

Padded member 182 may serve to reduce or mitigate damage to surface 178 and/or outer surface 114 or seizing of surface 178 to outer surface 114. In some examples, a padded member 184 may also be provided, for example, on surface 180. Padded member 184 may be similar to padded member 182, except that it provides a padded region between outer surface 114 and surface 180 in the first configuration (e.g., open configuration).

Accordingly, adaptable protective cover 100 can provide complete protection from debris and weather conditions, such as ice from directly hitting and/or forming on the LOI 22, which is generally a clear display. In some implementations, adaptable protective cover 100 can be mounted to measurement instrument 10 using minimal hardware by sliding housing element 110 over front cover 20 and operating deforming device 120 as described above, thereby mounting adaptable protective cover 100 to an external surface (e.g., outermost perimeter) of measurement instrument 10. The embodiments here can thusly be securely mounted using tension and friction fit with transmitter 12 and is not specific to any particular implementation of measurement instrument 10.

Figure 2A:
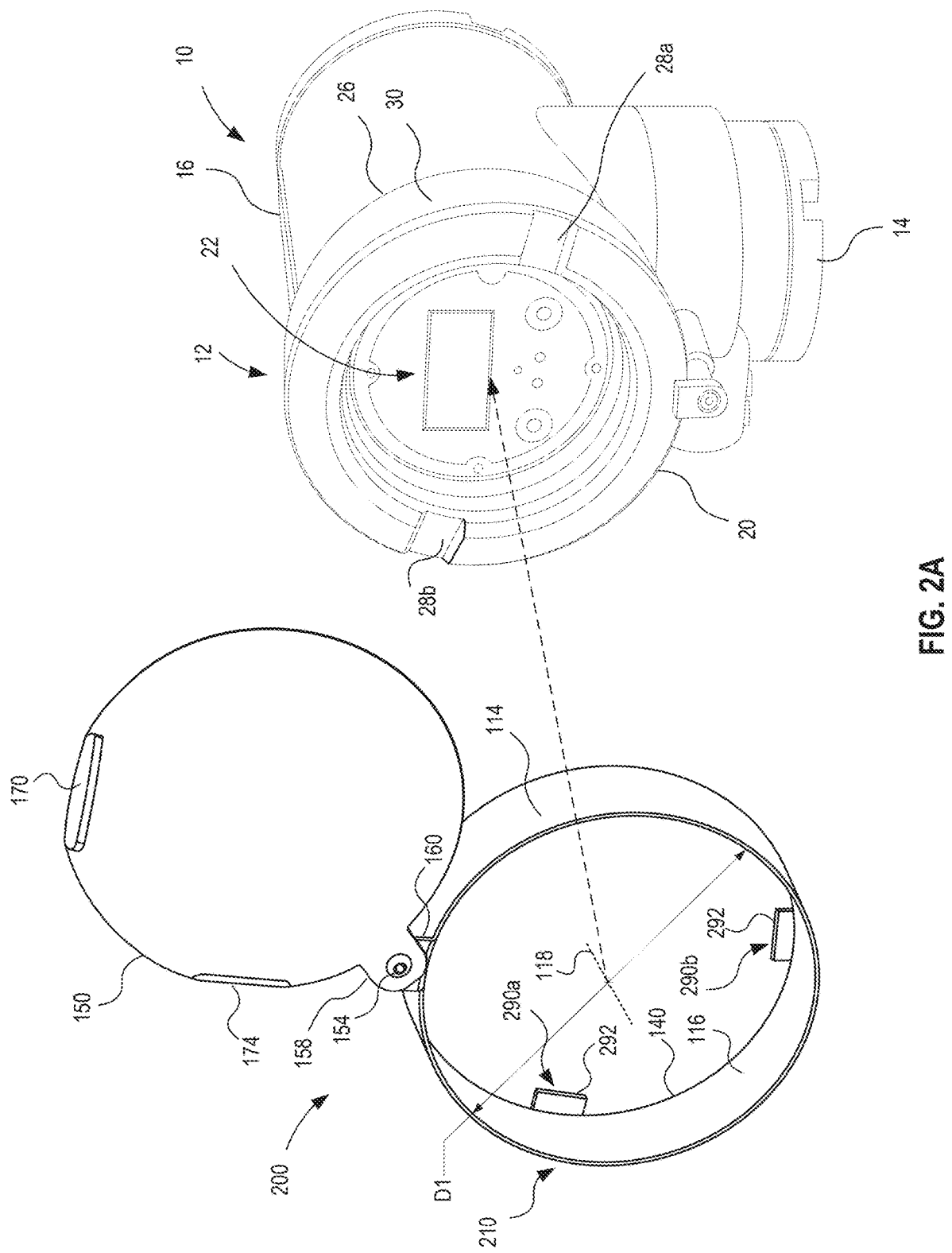
FIGS. 2A-2C depict an example of another adaptable protective cover, in accordance with an embodiment of the present disclosure.
Figures 2B, 2C:
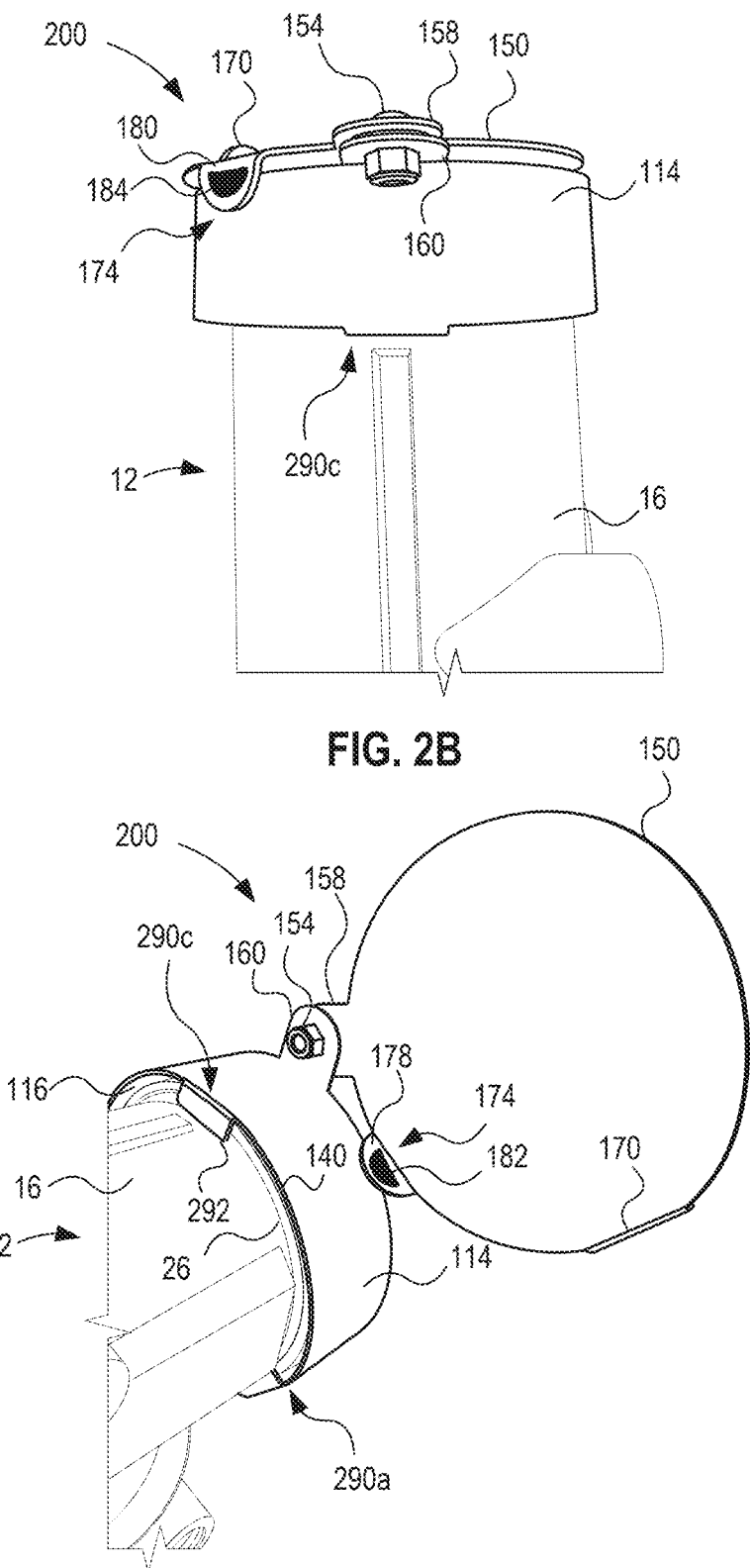

FIGS. 2A-2C depict an example of an adaptable protective cover 200, in accordance with an embodiment of the present disclosure. FIG. 2A depicts an exploded view of the adaptable protective cover 200, in the first configuration (e.g., open or unprotected configuration), that can be employed to cover measurement instrument 10. FIG. 2B is a top down view of the adaptable protective cover 200 attached to the measurement instrument 10 in the second configuration and FIG. 2C is a rear perspective view of adaptable protective cover 200 attached to the measurement instrument 10 in the second configuration.

Adaptable protective cover 200 is substantially similar to adaptable protective cover 100, except as provided herein. Thus, references numbers and parts described in connection with FIGS. 1A-1G are used in FIGS. 2A-2C to refer to similar or the same parts. Accordingly, adaptable protective cover 200 comprises rotatable cover plate 150 as described above in connection with FIGS. 1A-1G. Rotatable cover plate 150 is rotatably coupled to a housing element 210 that is configured to affix to the outermost surface 30 of the measurement instrument 10.

Housing element 210 may be substantially the same as housing element 110, except that housing element 210 comprises an attachment mechanism implemented as interlocking members 290a-290c (collectively referred to as interlocking members 290 and singularly referred to as interlocking member 290) disposed along a rear edge 140 of housing element 210. As shown in FIGS. 2B and 2C, the interlocking members 290a-290c may be configured to wrap around outermost surface 30 in a manner to affix housing element 210 to transmitter 12. For example, each interlocking member 290 may be provided as a tab protruding in a radial direction from rear edge 140 toward central axis 118. An end 292 of each interlocking member 290 may be position behind rear surface 26 of outermost surface 30. In some examples, a surface of each interlocking member 290 facing toward rotatable cover plate 150 may be brought into contact with rear surface 26. When each interlocking member 290 is positioned as shown in FIG. 2C, housing element 210 can be secured by a tension fit with outermost surface 30 between each interlocking member 290 and outermost surface 30. In some examples, each interlocking member 290 may be formed as a tab protruding from a sheet of material used to form housing element 210. This tab may be bent in the radial direction as shown. In another example, each interlocking member 290 may be a separate component that is attached or otherwise adhered to rear edge 140.

In the example of FIGS. 2A-2C, the housing element 210 comprises a continuous body in which ends 122 and 124 (of FIGS. 1A-1F) are connected at a single point forming a full tube or cylindrical shape. In another example, the body of housing element 210 may be similar to the body of housing element 110.

While not shown in FIGS. 2A-2C, housing element 210 may also comprise deforming device 120 as described above in connection with FIGS. 1A-1F. In this case, housing element 210 may be placed so to surround outermost surface 30 and then deforming device 120 operated to reduce the width D1. By reducing the width D1, each interlocking member 290 is brought so to overlap with rear surface 26 in a direction approximately parallel with central axis 118, thereby affixing housing element 210 to transmitter 12 as shown.

Figure 3A:
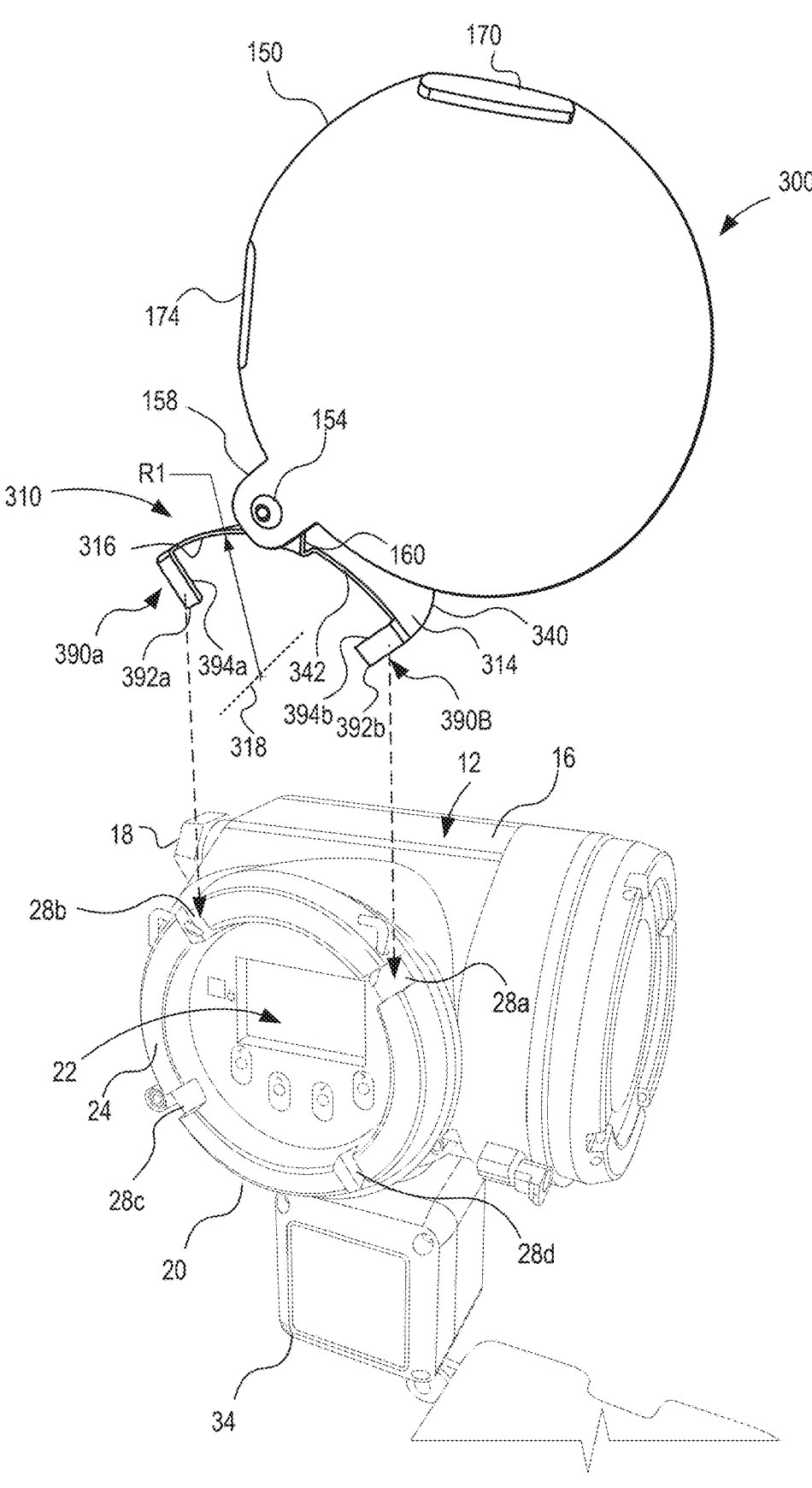
FIGS. 3A-3F depict an example of another adaptable protective cover, in accordance with an embodiment of the present disclosure.
Figure 3B:
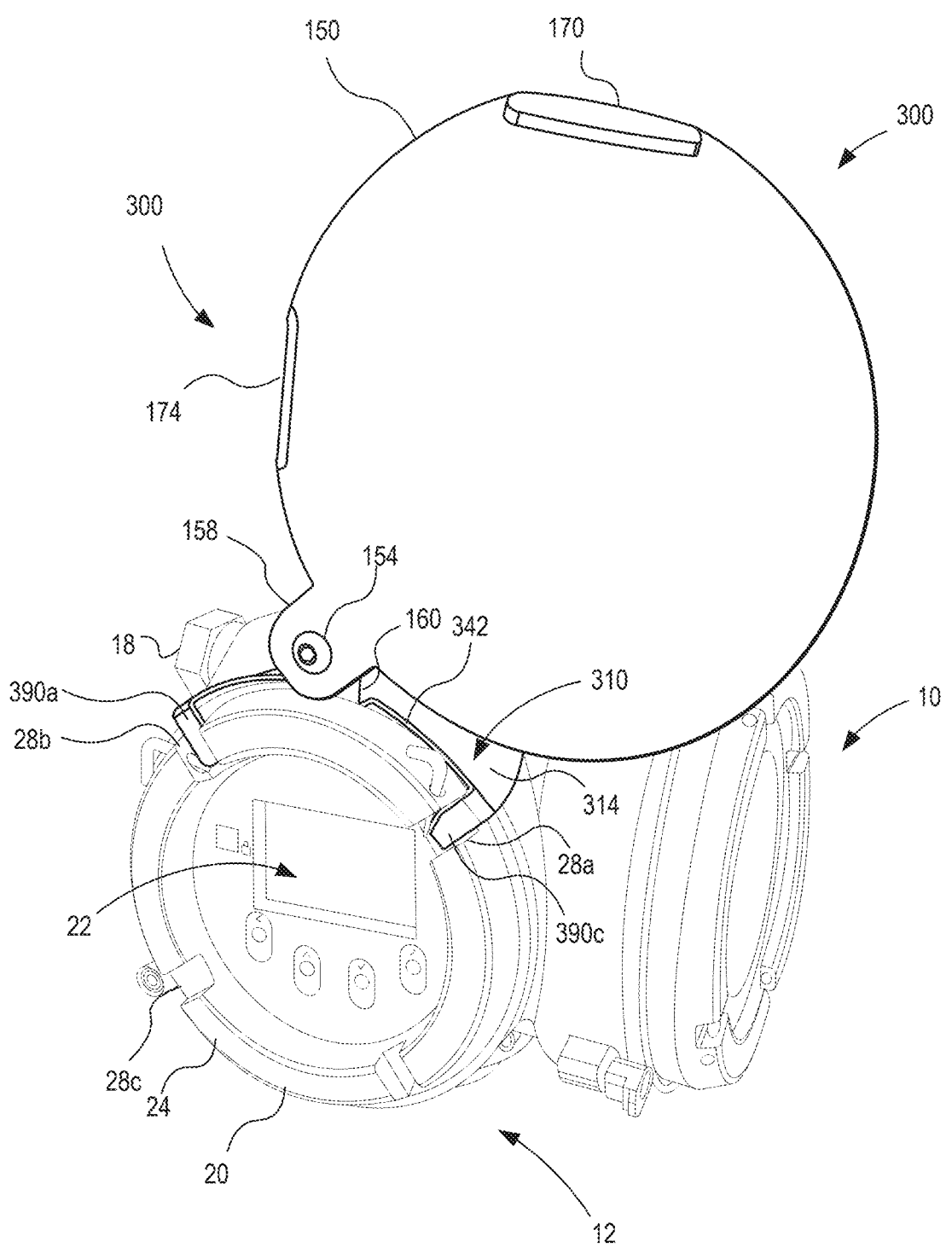
Figures 3C, 3D:
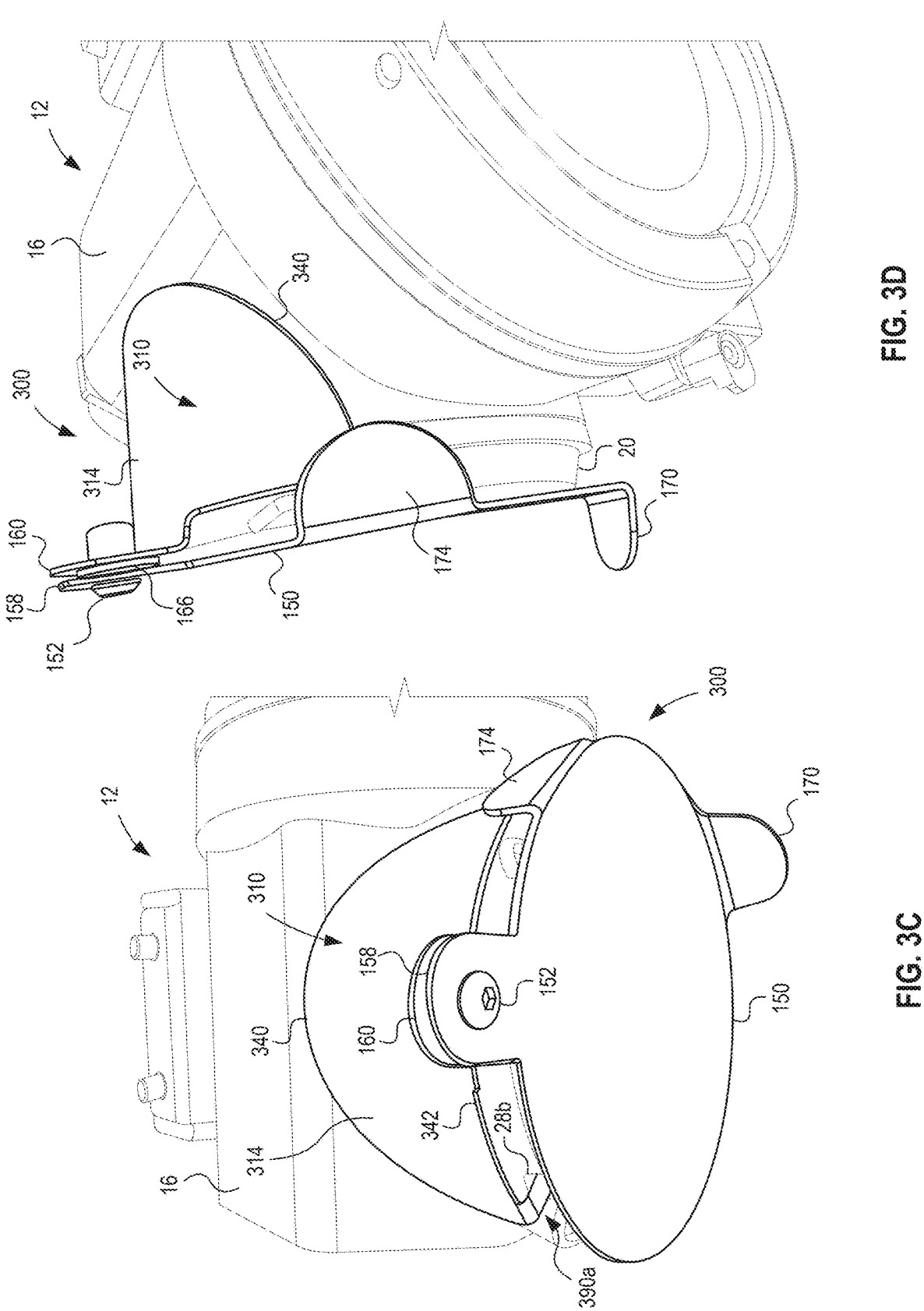
Figures 3E, 3F:
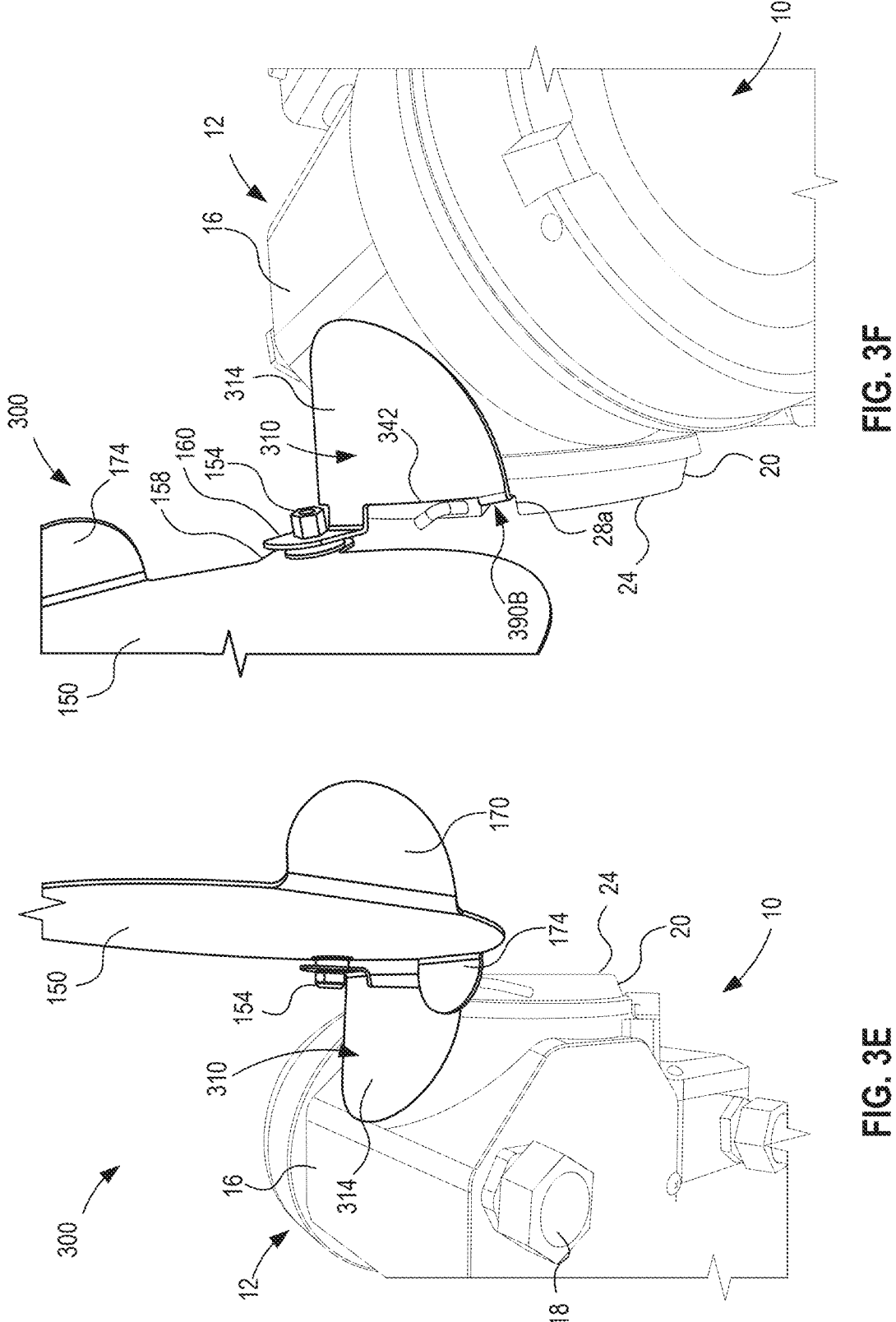

FIGS. 3A-3F depict an example of an adaptable protective cover 300, in accordance with an embodiment of the present disclosure. FIG. 3A depicts an exploded view of the adaptable protective cover 300, in a first configuration (e.g., open or unprotected configuration), that can be employed to cover measurement instrument 10. FIG. 3B is a perspective view of adaptable protective cover 300, in a second configuration (e.g., closed or protected configuration), attached to measurement instrument 10. FIG. 3C is a top down perspective view of the adaptable protective cover 300 attached to the measurement instrument 10 in the second configuration and FIG. 3D is a side view. FIGS. 3E and 3F are side views of the adaptable protective cover 300 in the first configuration.

Adaptable protective cover 300 is substantially similar to adaptable protective cover 100, except as provided herein. Thus, references numbers and parts described in connection with FIGS. 1A-1G are used in FIGS. 3A-3C to refer to similar or the same parts. Accordingly, adaptable protective cover 300 comprises rotatable cover plate 150 as described above in connection with FIGS. 1A-1G. Rotatable cover plate 150 is rotatably coupled to a housing element 310 that is configured to affix to the outermost surface 30 of the measurement instrument 10.

Housing element 310 may be similar to housing element 110 in that, for example, housing element 310 comprises protrusion 160 coupled plate 150 via joint 154. As with housing element 110, housing element 310 may be configured to at least partially surround the front cover 20 of an instrument. For example, in the example of FIGS. 3A-3F, housing element 310 may comprise a body having a portion of a tubular shape with an outer surface 314 and an inner surface 316 that extend between a front edge 342 and a rear edge 340. The inner surface 316 may have a width R1 (e.g., inner radius R1 in this example) that represents the largest width of the inner surface. The width R1 may be similar to half of the width D1 described in connection with FIGS. 1A-2C. Similar to the previous embodiments, inner surface 316 may contact outermost surface 30 of front cover 20 of the measurement instrument 10 once installed, for example, as shown in FIGS. 3B-3D.

Housing element 310 also comprises an attachment mechanism implemented as interlocking members 390a and 390b (collectively referred to as interlocking members 390 and singularly referred to as interlocking member 390) disposed along a front edge 342. As shown in FIGS. 3A-3C, the interlocking members 390 may be configured to interlock with outermost surface 30 in a manner to affix housing element 310 to transmitter 12. In some examples, each interlocking member 390 may be formed as a tab protruding from a sheet of material used to form housing element 310. This tab may be bent in the radial direction as shown. In another example, each interlocking member 390 may be a separate component that is attached or otherwise adhered to the front edge 342.

In the illustrative example of FIGS. 3A-3F, interlocking members 390a and 390b may be provided as tabs having ends 392a and 392b (collectively referred to as ends 392 and singularly referred to as ends 392), respectively, protruding in a radial direction from front edge 342 away from protrusion 160 (e.g., toward central axis 318). End 392 of each interlocking member 390 may be inserted into one of notches 28a-28d on front surface 24 of front cover 20. For example, as shown in FIGS. 3A-3C, end 392a of interlocking member 390a is inserted into notch 28b and end 392b of interlocking member 390b is inserted into notch 28a.

In some examples, interlocking members 390a and 390b comprise a inner surface 394a and 394b (collectively referred to as inner surfaces 394 and singularly referred to as inner surfaces 394), respectively, facing toward rotatable protrusion 160. The inner surfaces 394 may be brought into contact a surface of the respective notches 28a-28d so to hold the housing element 310 in place through a compression fit between each interlocking member 390 and a respective notch 28a-28d (e.g., friction between surface 394 and notch 28a-28d). When each interlocking member 390 is attached within a respective notch, as shown in FIG. 3B, housing element 310 can be secured by to the outermost surface 30.

In the example of FIGS. 3A-3F, the body of housing element 310 partially surrounds the front cover 20 in a radial direction. The body has a circumferential distance that is at least long enough for second operation member 174 to contact the outer surface 314 of housing element 310 and function as a stopper, as described above in connection with FIGS. 1A-1G. This is illustratively depicted in FIGS. 3C and 3D in which second operation member 174 contacts outer surface 314 to hold plate 150 in the second configuration and FIG. 3E in which second operation member 174 contacts outer surface 314 to hold plate 150 in the first configuration. In the example of FIGS. 3A-3F, second operation member 174 and first operation member 170 are shown as not including padded member 182 or padded member 184.

While the examples shown in FIGS. 3A-3F depict housing element 310 partially surrounding front cover 20, embodiments disclosed herein are not intended to be limited thereto. Housing element 310 may have any circumferential length as desired. Housing element 310 may partially or fully encompass front cover 20 and any length therebetween. For example, housing element 310 may fully encompass front cover 20 similar too housing element 110 and/or housing element 210. In this configuration, housing element 310 may comprise more or fewer interlocking member 390 as desired to affix adaptable protective cover 300 to measurement instrument 10. For example, housing element 310 may comprise four interlocking member 390, one interlocking member 390 interlocking with each of notch 28a-28d. In another example, housing element 310 may comprise two interlocking member 390, on opposite sides of housing element 310 (e.g., 180 degrees around the housing element 310 when housing element 310 surrounds a substantial amount of front cover 20). In another example, housing element 310 may have one interlocking member 390 or more than four. Housing element 310, in some examples, may also comprise deforming device 120 as described above. In this case, deforming device 120 and interlocking member 390 may each operate to hold housing element 310 around measurement instrument 10, while deforming device 120 may also operate to bring interlocking member 390 into a respective notch.

The configurations of the adaptable protective cover 300 provides for adaptability in configurations and design that enables universal applicability. For example, housing element 310 and locations of interlocking members 390 can be adaptable, for example, during manufacture, to be easily and efficiently compliant to any instrument. Thus, manufacturing processes need not be altered and parts need not be redesigned to be applicable to different instruments, thereby providing universal applicability.

Figure 4A:
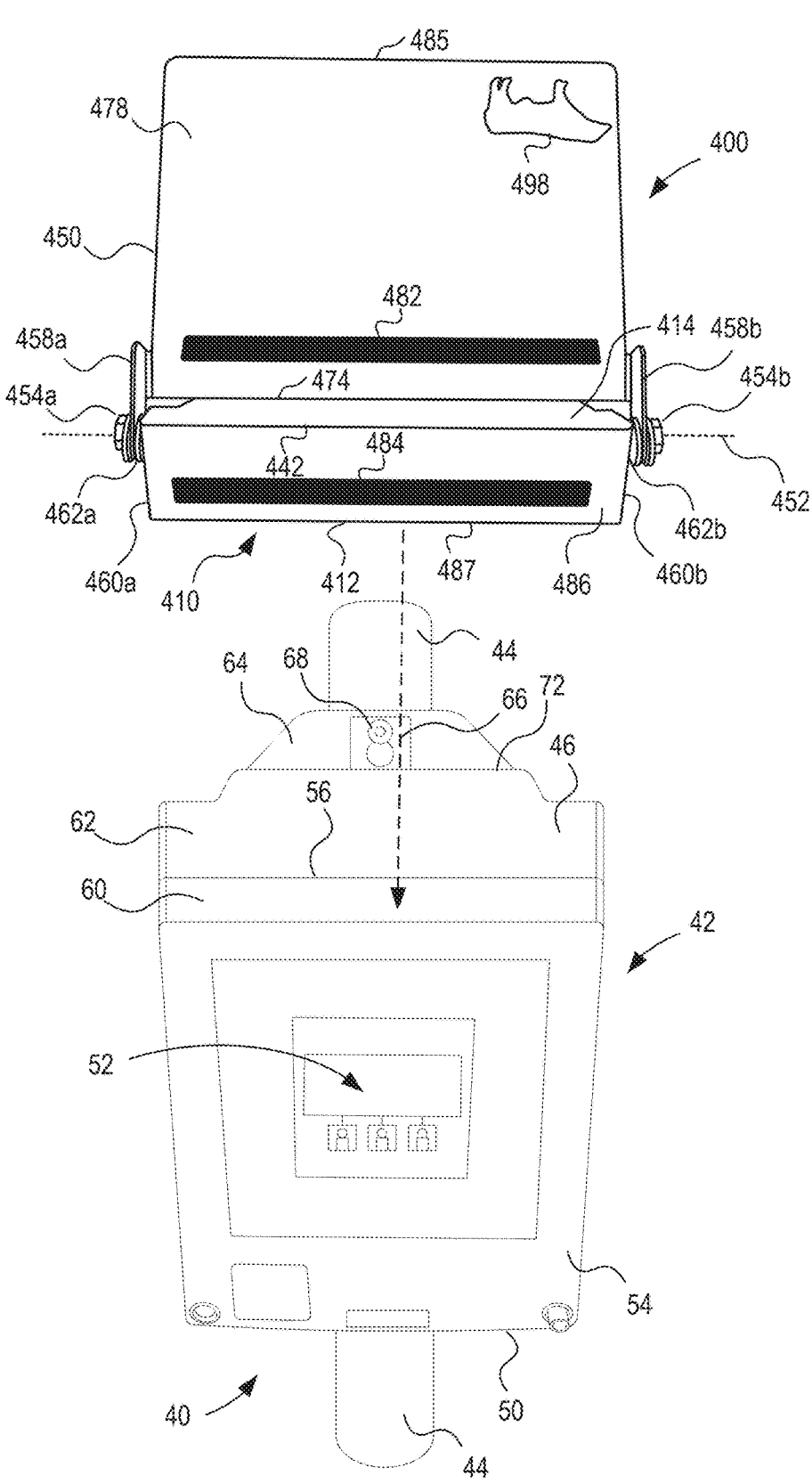
FIGS. 4A-4H depict an example of another adaptable protective cover, in accordance with an embodiment of the present disclosure.
Figures 4B, 4C:
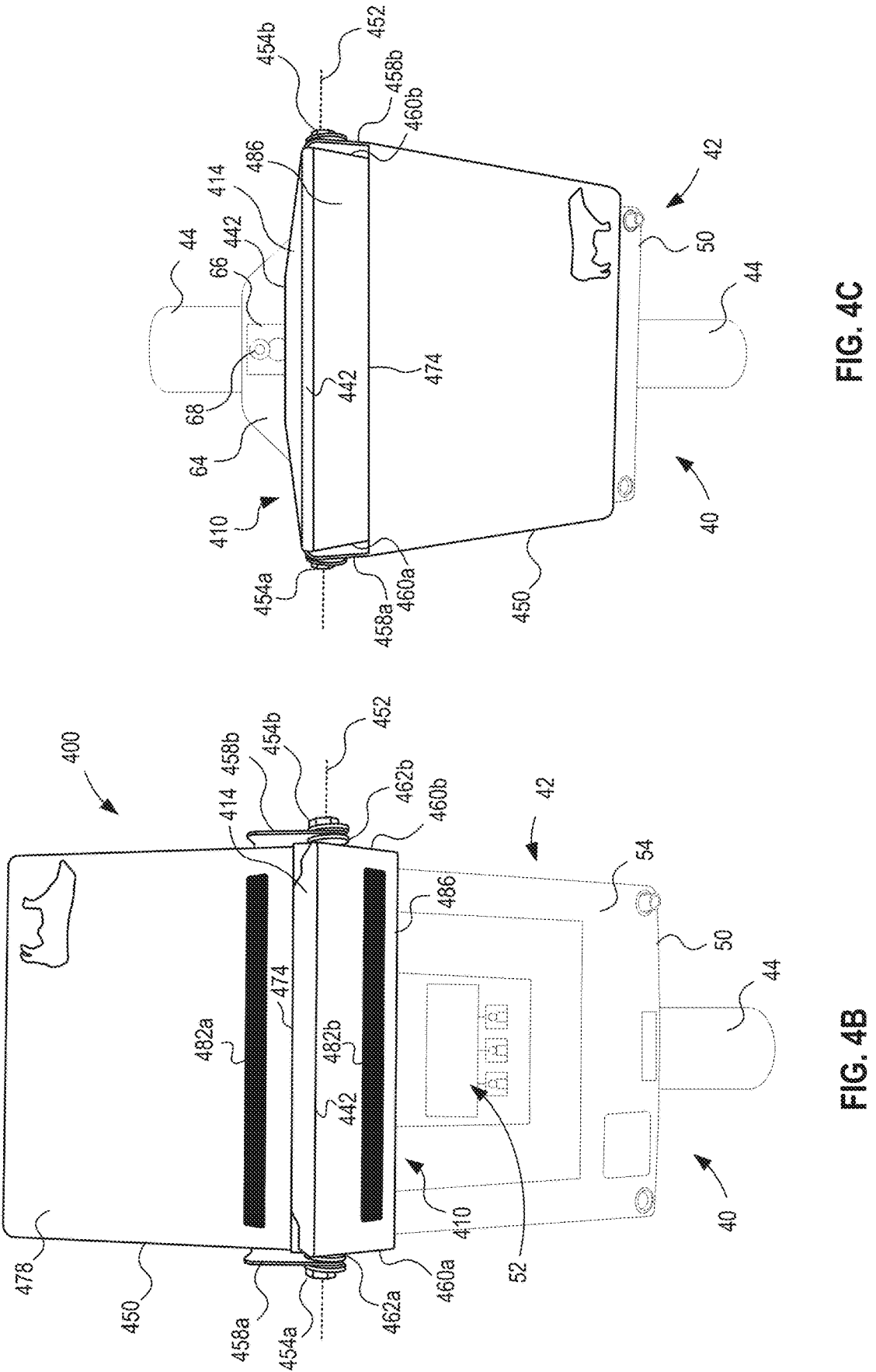
Figures 4D, 4E:
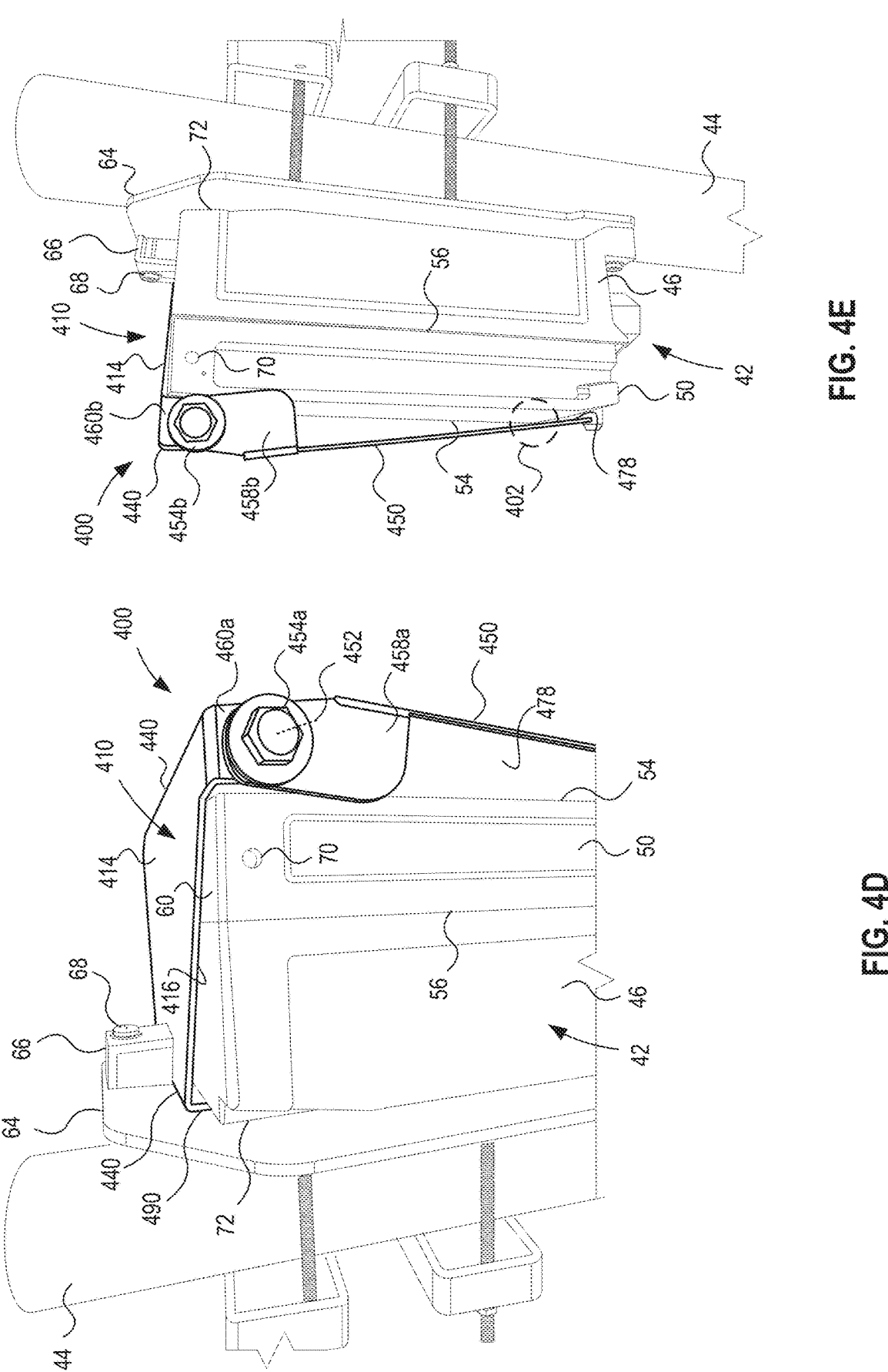
Figures 4F, 4G, 4H:
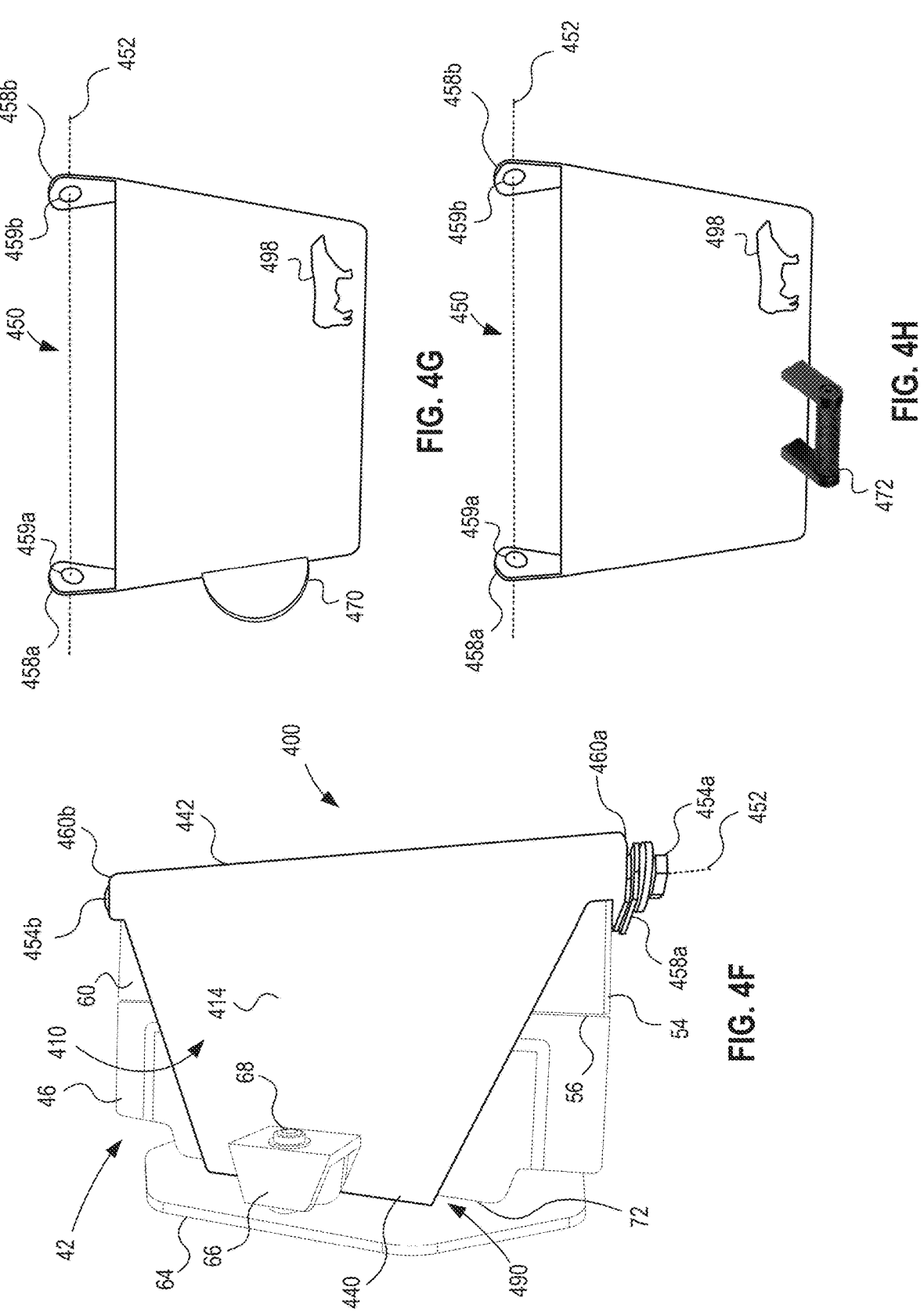

FIGS. 4A-4H depict an example of an adaptable protective cover 400, in accordance with an embodiment of the present disclosure. FIG. 4A depicts an exploded view of the adaptable protective cover 400, in a first configuration (e.g., open or unprotected configuration), that can be employed to cover a measurement instrument 40. FIG. 4B is a front view of adaptable protective cover 400, in the first configuration, attached to measurement instrument 40 and FIG. 4C is a front view of adaptable protective cover 400, in a second configuration (e.g., closed or protected configuration), attached to measurement instrument 40. FIGS. 4D and 4E are side views of the adaptable protective cover 400 in the second configuration. FIG. 4F is a top down perspective view of the adaptable protective cover 400 attached to the measurement instrument 40 in the second configuration.

In the example of FIGS. 4A-4F, measurement instrument 40 is similar to measurement instrument 10, except that measurement instrument 40 comprises an integral mount transmitter 42 having a generally rectangular or square shape. Similar to measurement instrument 10, measurement instrument 40 may comprise a pipe section (not shown) that attaches transmitter 42 to a sensor housing. The transmitter 42, in this example, can comprise a transmitter housing 46 that houses electronics boards (such as, for example, a controller or computation systems comprising processors and memories) for receiving sensor data of process variables from the sensor components and performing operations of the measurement instrument 40 based on the sensor data. In the example of FIGS. 4A-4F, a rear surface 72 of transmitter housing 16 is attached to a mounting structure 64 via a tab 66 and a fastener 68. The mounting structure 64 may be, for example, a plate or other surface in the field to which measurement instrument 40 can be attached. In the example of FIGS. 4A-4F, the mounting structure 64 is depicted as attached to a pole 44 via vise grips and threaded fasteners, shown in FIGS. 4D and 4C.

Measurement instrument 40 also comprises a front cover 50 and a LOI 52. LOI 52 may be substantially similar to LOI 22 described above, except that it has a generally rectangular or square shape. Similarly, front cover 50 may be substantially similar to front cover 20 described above, except that it has a generally rectangular or square shape. Front cover 50 comprises front surface 54 and a rear surface 56 that interfaces with the housing 16 forming a cavity in which the electronics boards, controllers, and other circuitry of the transmitter 42 can be housed for providing functionality of measurement instrument 40. Front cover 50, in this example, comprises a upper surface 60 and housing 46 comprises upper surface 62.

Adaptable protective cover 400 in the example of FIGS. 4A-4F can be used to protect the transmitter 42, such as the LOI 52, from environmental conditions. Adaptable protective cover 400 comprises a housing element 410 that is configured to affix to the surface 60 of the measurement instrument 40 and least partially surround the front cover 50 of measurement instrument 40. For example, in the example of FIGS. 4A-4F, housing element 410 may comprise a body 412 having an outer surface 414 and an inner surface 416 that at least partially covers surface 60 of front cover 50. The body 412 may extend from a rear edge 440 to a front edge 442. The inner surface 416 may be brought into close proximity to surface 60 and, in some examples, may contact surface 60. The inner surface 416 may also contact a portion of upper surface 62 in some cases. In various examples, housing element 410 may be formed as a sheet of material having that is cut and bent to form body 412. The housing element 410 may be formed from materials, such as metal, plastics, or other materials as desired.

Housing element 410 also comprises an interlocking member 390 disposed along a rear edge 440 of housing element 410. As shown in FIGS. 4D-4F, the interlocking member 390 may be configured to wrap around rear surface 72 in a manner to affix housing element 410 to transmitter 42. In the illustrative example of housing element 410, an attachment mechanism can be implemented as interlocking member 490. The interlocking member 490 may be provided as a tab protruding from rear edge 440 and overlapping with rear surface 72 along a direction extending from rear edge 440 to front edge 442. An end of interlocking member 390 may be position behind rear surface 72, for example, within a gap between rear surface 72 and mounting structure 64. In some examples, a surface of interlocking member 490 facing toward front edge 442 may be in contact with rear surface 72. When interlocking member 490 is positioned as shown in FIGS. 4D-4F, housing element 410 can be secured by a tension fit with rear surface 72 between interlocking member 490 and rear surface 72. In some examples, interlocking member 490 may be formed as a tab protruding from a sheet of material used to form housing element 410. This tab may be bent in the direction as shown in FIGS. 4D-4F. In another example, interlocking member 490 may be a separate component that is attached or otherwise adhered to rear edge 440.

As with the preceding embodiments, table protective cover 400 can be universally scalable to fit to any instrument or device. For example, sizing and configurations of housing element 410, cover plate 450, and interlocking members 490 can be adaptable, for example, during manufacture, to be easily and efficiently compliant to any instrument. Thus, manufacturing processes need not be altered and parts need not be redesigned to be applicable to different instruments, thereby providing universal applicability.

In the example of FIGS. 4A-4F, housing element 410 comprises a protective lip 486 extending from rear edge 440 in a direction generally similar to interlocking member 490. In some examples, protective lip 486 may extend in a direction approximately parallel to interlocking member 490. In another example, protective lip 486 may extend downward from rear edge 440 and in a direction toward interlocking member 490, thereby causing a compression fit through a pinching-like functionality between interlocking member 490 and protective lip 486. In another example, protective lip 486 may extend downward from rear edge 440 in a direction away from interlocking member 490. In some embodiments, protective lip 486 may provide protection to transmitter 42 (e.g., LOI 52) from environmental conditions. For example, protective lip 486 may provide a shield from run-off water, liquids or other particulates. Thus, a bottom edge 487 of protective lip 486 may overlap with front cover 50 in a direction extending between rear edge 440 and front edge 442.

The adaptable protective cover 400, according to various embodiments, also comprises a rotatable cover plate 450 configured to rotate about a pivot axis 452. In the example of adaptable protective cover 400, pivot axis 452 may be approximately parallel to front edge 442. The rotatable cover plate 450 may be provided as a planar sheet of material having a generally rectangular or square profile, in this example. Protrusions 458a and 458b can be formed on opposite sides of rotatable cover plate 450 extending in a direction from an upper edge 474 of rotatable cover plate 450 toward pivot axis 452. Corresponding surfaces 460a and 460b can be formed on the housing element 410, which may extend in a direction approximately perpendicular to protective lip 486 and surface 414. In an example, protrusions 458a and 458b can be formed planar with the body of rotatable cover plate 450 and then bent in a direction to overlap with surfaces 460a and 460b, respectively.

As shown in the examples of FIGS. 4A-4F, adaptable protective cover 400 comprises joints 454a and 454b provided along a pivot axis 452. The joints 454a and/or 454b may be implemented as hinged joints, pivot joints, or the like. The pivot axis 452 may pass through through-holes 459a and 459b of protrusions 458a and 458b, respectively (as shown in FIGS. 4G and 4H). Protrusions 458a and 458b may each comprise a through-hole 459a and 459b, respectively, provided along pivot axis 452 and configured to receive a respective joint 454a and 454b. Surfaces 460a and 460b may also comprise corresponding through-holes provided along pivot axis 452 for receiving respective joint 454a and 454b. Joints 454a and 454b may be substantially similar to joint 154 described above. As such, joints 454a and 454b may each comprise a slidable surface that permits rotatable cover plate 450 to rotate about pivot axis 452 relative to housing element 410. In some examples, washers 462a and 462b may be provided between rotatable cover plate 450 and housing element 410. For example, washer 462a may be aligned along pivot axis 452 and positioned between protrusion 458a and surface 460a and washer 462b may be aligned along pivot axis 452 and positioned between protrusion 458b and surface 460b. Accordingly, rotatable cover plate 450 can be rotated between a first configuration (e.g., as shown in FIGS. 4A and 4B) and a second configuration (e.g., as shown in FIGS. 4C-4F). In the first configuration, the LOI 52 is uncovered and may be exposed to environmental conditions, while in the second configuration the rotatable cover plate 450 covers LOI 52. While in the second configuration, the rotatable cover plate 450 can protect the measurement instrument 40, for example, LOI 52, from environmental conditions. In some examples, a portion of surface 478 of rotatable cover plate 450 may contact a portion of front surface 54 of front cover 50, as shown in region 402.

The joints 454a and 454b, according to various example, may be a mechanism that holds protrusions 458a and 458b in position relative to surfaces 460a and 460b, respectively, along pivot axis 452 while enabling rotatable cover plate 450 to rotate about pivot axis 452. In an illustrative example, similar to joint 154, joints 454a and 454b may comprise a bolted joint that is secured by a nut, with a spacer washer disposed between each surface 460a and protrusion 458a and between surface 460b and protrusion 458b, respectively, to permit rotation therebetween. In some examples, the body of the bolted joint may be inserted in a sleeve that is disposed along pivot axis 452 within the through holes of protrusions 458a and 458b and surfaces 460a and 460b.

In some embodiments, one or more padded members may be attached to 400, for example, substantially similar to padded members 182 and/or 184 as shown in FIGS. 1E, 1F, 2B, and 2C. For example, rotatable cover plate 450 may comprise a padded member 482 disposed on surface 478 adjacent to top edge 474. The position of padded member 482 may be provided such that padded member 482 contacts protective lip 486 when adaptable protective cover 400 is in the second configuration. The padded member 482 may be provided as a rubber, foam, or other material to provide a padded or cushioned surface, thereby protecting protective lip 486 from damage. In some examples, either alone or in combination with padded member 482, a padded member 484 may also be provided, for example, on protective lip 486. Padded member 484 may be similar to padded member 482, except that it is formed on protective lip 486 so to contact rotatable cover plate 450 when adaptable protective cover 400 is in the second configuration.

In some examples, top edge 474 may function as a stopper similar to second operation member 174 described above. For example, top edge 474 may operate to constrain rotation of rotatable cover plate 450 about pivot axis 452 by contacting surface 414 when in the first configuration, as shown in FIG. 4B. In some examples, a padded member (not shown in FIGS. 4A-4F) may be provided at the position that top edge 474 contacts surface 414 to protect surface 414 from damage due to contact between top edge 474 and surface 414.

Rotatable cover plate 450 according to various examples may also comprise one or more operation members. For example, FIGS. 4G and 4H depict examples of rotatable cover plate 450 comprising example implementations of an operation member that may be adapted as an operator interface. IN both examples, the operation member may function as a handle that a local operator may interface with to rotate rotatable cover plate 450 between the first and second configurations. In the example of FIG. 4G, rotatable cover plate 450 comprises operation member 170 provided as a tab formed into the sheet of material forming rotatable cover plate 450. The tab may be bent in a direction away from housing element 410 while in the second configuration. In this case, operation member 170 is illustratively provided as a semicircular tab that a user may grasp or otherwise interact with to induce rotation of rotatable cover plate 450. In some examples, operation member 170 may be coated with or otherwise comprise a high friction surface, for example, rubber, foam, or other material that an operator may grasp.

Operation member 470, in this example, is formed along a side edge of rotatable cover plate 450, which may enable efficient and ease of rotation about pivot axis 452. However, operation member 470 may be position at any position desired, for example, along an opposing edge, along bottom edge 485, or along top edge 474. In another example, first operation member 170 need not be located at the perimeter of rotatable cover plate 450.

FIG. 4G depicts an example in which operation member is implemented as a handle 472 (e.g., similar to handle 172) disposed along bottom edge 487. As noted above, handle 472 may be positioned as desired on rotatable cover plate 450. As another example, handle 472 may be implemented as a rod that can be grasped by an operator. In some cases, handle 472 may be rotatable relative to rotatable cover plate 450 to permit grasping of the handle (e.g., a rod or other revolving handle) and rotating of rotatable cover plate 450 without having to readjust a grip of the operator.

FIGS. 4A-4G also depict an optional logo or other identifier 498 provided in rotatable cover plate 450. In this example, a cow or bull shaped logo is cut through rotatable cover plate 450 forming the identifier 498. Other shapes or logos can be used as desired.

FIGS. 4A-4F provide an illustrative example of one of the benefits provided by embodiments disclosed herein. For example, as shown in FIGS. 4D and 4E, measurement instrument 40 includes holes 70 adapted to receive pegs of an instrument specific protective cover. Thus, in the case of measurement instrument 40, the front cover 50 is specifically designed for a specific cover. Whereas, embodiments disclosed herein do require utilization of holes 70 to attach to and thereby protect measurement instrument 40, for example, by utilizing a compression fit and friction to attached to external surfaces (e.g., surface 60 and/or surface 30) of measurement instruments. Thus, embodiments disclosed herein can be used in connection with numerous different measurement instruments.

Figures 5A, 5B:
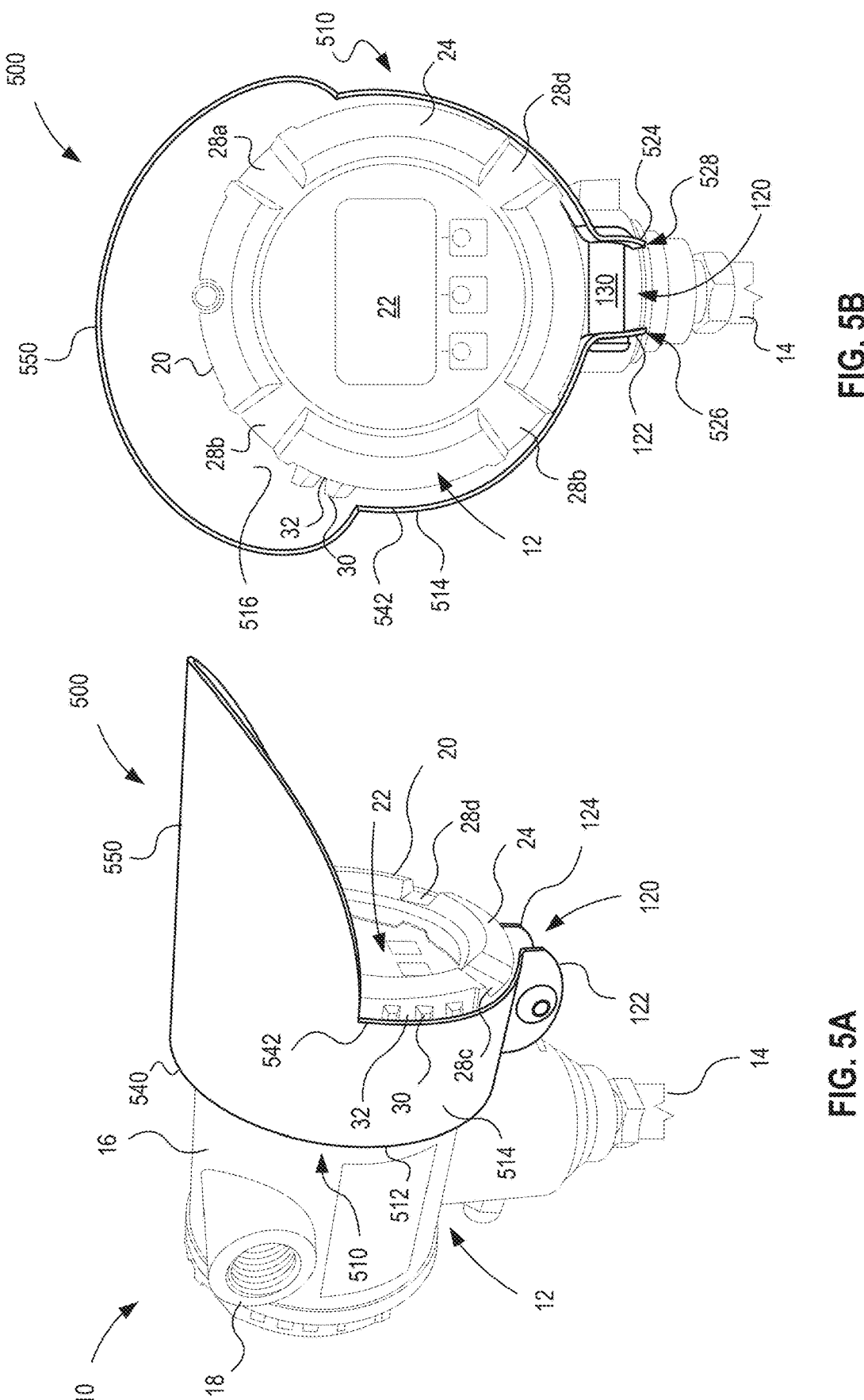
FIGS. 5A and 5B depict an example of another adaptable protective cover, in accordance with an embodiment of the present disclosure.

FIGS. 5A and 5B depict an example of an adaptable protective cover 500, in accordance with an embodiment of the present disclosure. FIG. 3A depicts a perspective view of adaptable protective cover 500 attached to measurement instrument 10 and FIG. 5B is a front view of the adaptable protective cover 500 attached to the measurement instrument 10.

Adaptable protective cover 500 is substantially similar to adaptable protective cover 100, except as provided herein. Thus, references numbers and parts described in connection with FIGS. 1A-1G are used in FIGS. 5A and 5B to refer to similar or the same parts. For example, housing element 510 may be configured to surround the perimeter of outermost surface 30 of the measurement instrument 10 as describe above. Similar to housing element 110, housing element 510 may comprise a body 512 having a generally a tubular shape with a cylindrical outer surface 514 and a cylindrical inner surface 516 extending between a front edge 542 and a rear edge 540, with an opening along a central axis. In various examples, housing element 510 may be formed as a sheet of material having that is bent around central axis 118 to form a cylindrical body. Additionally, housing element 510 may include first coupling member 122 and second coupling member 124, as described in FIGS. 1A and 1F, formed at ends 526 and 528. A deforming device 120 provided can be provided between first and second coupling members 122 and 124, as described in connection with FIGS. 1A-1G. Thus, housing element 510 may be placed so to surround outermost surface 30 and then deforming device 120 operated to reduce the width of housing element 510 (e.g., via threaded couple 130). By reducing the width, each an inner surface 516 of housing element 510 can be brought in contact with outermost surface 30 providing a compression fit as described above.

In various examples, housing element 110 may be formed as a sheet of material having that is bent around a central axis to form a cylindrical body. The sheet may have a rectangular (e.g., rounded rectangular shape in this example) that is bent to form the housing element 510. Ends 526 and 528 can be further bent in an opposite direction as the body to form first coupling member 122 and second coupling member 124, as described in FIGS. 1A and 1F. The housing element 510 may be formed from materials, such as metal, plastics, or other materials as desired.

Housing element 510 may also comprise a protective cover 550 extending from edge 542. For example, as shown in FIGS. 5A and 5B, protective cover 550 may extend in a direction approximately parallel to the central axis of housing element 510 and in a direction opposite of rear edge 540. The protective cover 550 may comprise a spatulate shape, as shown in FIG. 5A, similar to a duck bill. The spatulate shape of front cover 50 may be provide protection from environmental conditions above the measurement instrument 10 (e.g., water, sunlight, etc.).

While note shown in FIGS. 5A and 5B, adaptable protective cover 500 may comprise interlocking members configured to further restrain adaptable protective cover 500 on measurement instrument 10. For example, adaptable protective cover 500 may comprise one or more of interlocking members 290 and/or 390, as described above.

Figure 6A:
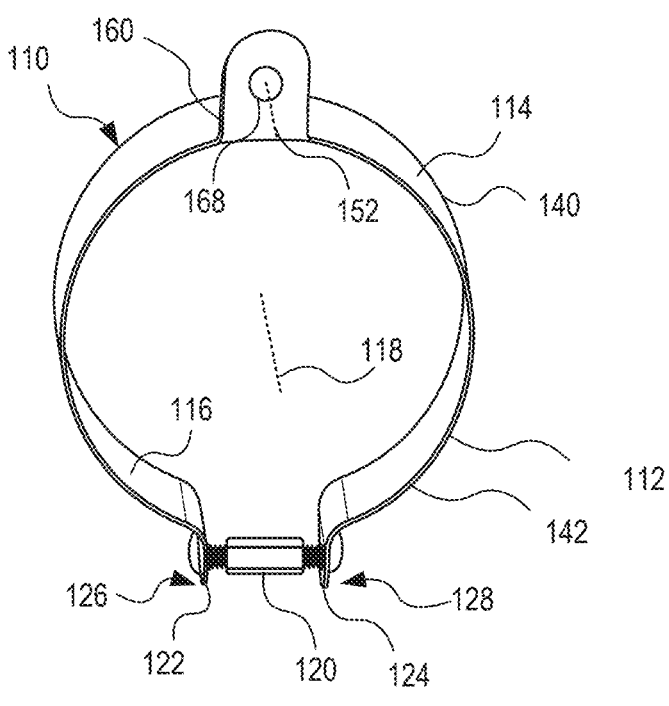
FIGS. 6A-6C depict an example of adaptable protective cover having a modular design, in accordance with an embodiment of the present disclosure.
Figure 6B:
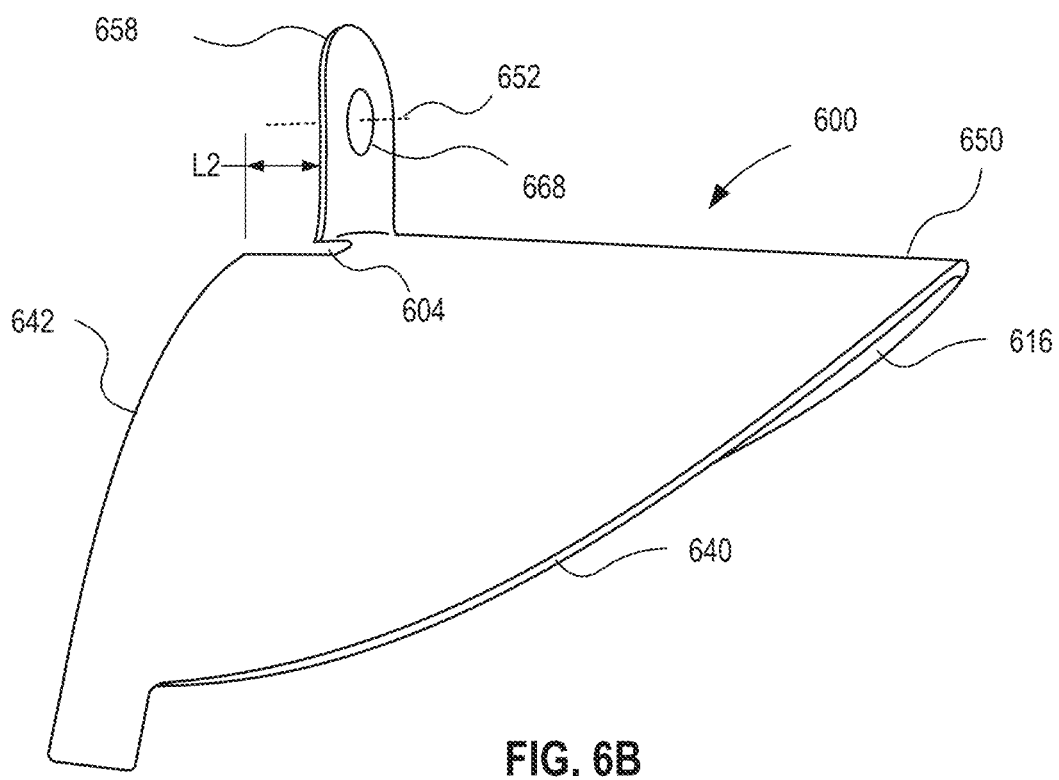
Figure 6C:
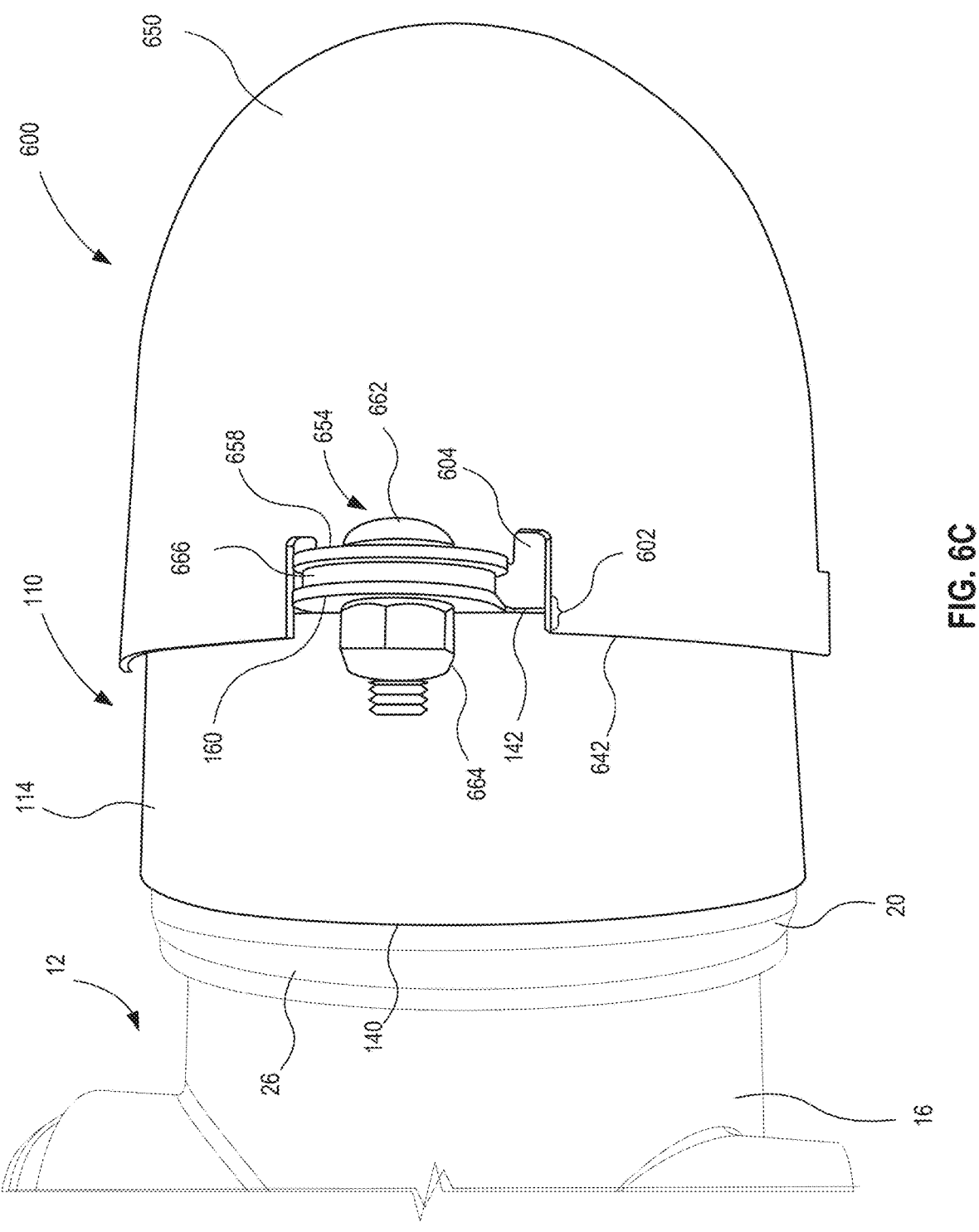

In some embodiments, the adaptable protective covers according to the present disclosure may have a modular design that provides for interchangeability between cover plates according to a desired application. For example, FIGS. 6A-6C depict an example of adaptable protective cover having a modular design, in accordance with an embodiment of the present disclosure. FIG. 6A depicts the adaptable protective cove 100, as described in connection with FIGS. 1A-1G, with the rotatable cover plate 150 removed. As such, alternative protective covers can be attached to front edge 142 via protrusion 160. FIG. 6B depicts an example protective cover 600 that can be attached to the 110. In this example, protective cover 650 comprise a spatulate shape that extends in a direction approximately parallel to the central axis 118, when attached to housing element 110 (as shown in FIG. 6C) and opposite rear edge 140. Accordingly, protective cover 650 may offer similar functionality as protective cover 550 of FIGS. 5A and 5B.

The protective cover 600 comprises an interlocking mechanism or other means of attachment to the housing element 110. In the example shown in FIGS. 6A-6C, protective cover 600 comprises a protrusion 658 that extends in a radial direction away from the central axis 118, when attached to housing element 110. Protrusion 658 and protrusion 160 may each comprise a through hole 668 and 168, respectively, provided along axis 152 and configured to receive joint 654. Joint 654 may be similar to joint 154 of FIGS. 1A-1G. In an illustrative example joint 654 may comprise a bolted joint 662 that is secured by a nut 664. A spacer washer 666 may be disposed between protrusion 160 and protrusion 658, which may be similar to washer 166 described above.

As shown in FIGS. 6B and 6C, protrusion 658 may be positioned on the outer surface of protective cover 650 at position in the axial direction (e.g., a direction approximately parallel to central axis 118 when attached to the housing element 110) that is between rear edge 645 and front edge 640. The position of the protrusion 658 may be provided such that, when attached to housing element 110, the protective cover 650 overlaps with a portion of outer surface 114 of housing element 110 (shown as overlap 602). Thus, front edge 142 of housing element 110 may be positioned between rear edge 642 and front edge 640, as shown in FIG. 6C.

In some examples, protective cover may be formed from a single sheet of material, similar to housing element 110 as described above. In this case, a single sheet of material (e.g., metal in this example) may be cut to the desired shape and then bent to form the spatulate curvature of the protective cover 650. The protrusion 658 may then be bent from the sheet of material in the desired direction. To provide for bending of the material, cutouts may be formed on both sides of the protrusion, an example of which is shown as cut out 604.

FIGS. 6A-6C illustrate an example protective cover a modular design based on housing element 110. Examples herein are not limited to this example only, other housing elements may have a similar modular design so as to switch out desired protective covers. Accordingly, housing element 210, form housing element 310, and housing element 410 may each have a modular design providing interchangeability between the rotating cover plate other cover plates implementations.

Additionally, while FIGS. 6A-6B provide a specific interlocking mechanism example, embodiments disclosed herein are not intended to be limited to this implementation only, which is provided for illustrative purposes. For example, protective cover 650 may be attached to housing element 110 through any desired methods, such as interlocking teeth, clamps, hinges, etc. Furthermore, in some example, protective cover 650 may be rotatable about axis 652. In another example, an interlocking mechanism may be provided as a hinge or other pivot axis aligned approximately perpendicular to central axis 118 that permits protective cover 650 to flip upward, similar to the example of FIGS. 4A-4E.

In some examples of the various embodiments disclosed herein, the hinge or joints for attaching the various rotatable protective covers (e.g., rotatable cover plate 150, rotatable cover plate 450, and/or protective cover 650) may be spring loaded or provide other self-closing functionality. As such, the rotatable protective covers may be held in a closed position via a spring loaded joint/hinge and operated via a user interaction that intends the opening of the protective covers.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A protective cover comprising:
a housing element having a continuous body that at least partially surrounding an opening along a central axis, the body extending in a direction at least approximately parallel to the central axis, wherein the housing element comprises
a first coupling member at a first end of the body, and
a second coupling member at a second end of the body;
a cover plate attached to the housing element, the cover plate configured to at least partially cover the opening; and
an attachment mechanism disposed on the body of the housing element, the attachment mechanism being adaptable for attaching the housing element to a plurality of measurement instruments, wherein the attachment mechanism is coupled between the first and second coupling member and operable to change a distance between the first and second coupling members.

2. The protective cover of claim 1, further comprising:
a joint disposed on an edge of the body, the joint having a pivot axis,
wherein the cover plate is coupled to the joint and configured to rotate about the pivot axis.

3. The protective cover of claim 2, wherein the pivot axis is at least approximately parallel to the central axis.

4. The protective cover of claim 2, wherein the pivot axis is at least approximately perpendicular to the central axis.

5. The protective cover of claim 1, wherein the attachment mechanism comprises a threaded coupler between the first and second coupling members.

6. A protective cover comprising:
a housing element having a continuous body that at least partially surrounding an opening along a central axis, the body extending in a direction at least approximately parallel to the central axis;
a cover plate attached to the housing element, the cover plate configured to at least partially cover the opening; and
an attachment mechanism disposed on the body of the housing element, the attachment mechanism being adaptable for attaching the housing element to a plurality of measurement instruments, wherein the attachment mechanism is disposed on an edge of the body of the housing element, wherein the attachment mechanism comprises one or more protrusions extending in a direction toward the central axis and wherein, the one or more protrusions interface with a measurement instrument.

7. The protective cover of claim 6, wherein the one or more protrusions interface with at least one of: a rear surface of the measurement instrument and a front surface of the measurement instrument.

8. A protective cover comprising:
a housing element having a continuous body that at least partially surrounding an opening along a central axis, the body extending in a direction at least approximately parallel to the central axis;
a cover plate attached to the housing element, the cover plate configured to at least partially cover the opening;
one or more operation members disposed on the cover plate, the one or more operation members operable to manipulate the cover plate;
an attachment mechanism disposed on the body of the housing element, the attachment mechanism being adaptable for attaching the housing element to a plurality of measurement instruments, wherein the attachment mechanism is disposed on an edge of the body of the housing element.

9. The protective cover of claim 8, wherein the one or more operation members comprises:
a first protrusion extending from the cover plate in a direction toward the housing element, wherein the first protrusion is operable as a stopper; and
a handle extending from the cover plate in a direction opposite the first protrusion.

10. The protective cover of claim 1, wherein the opening is configured to receive a measurement instrument of the plurality of measurement instruments, and wherein the attachment mechanism is operable to affix the housing element to the measurement instrument via a tension or friction fit.

11. An adaptable instrument shielding device, comprising:
a housing element having a body and an opening along a central axis, the opening extending from a first edge of the body to a second edge of the body adaptable to receive a plurality of different measurement instruments; and
an attachment mechanism attached to the housing element, the attachment mechanism operable to change a size of the opening and hold the housing element to a measurement instrument via a tension fit; and
a cover plate attached to the housing element and configured to cover the measurement instrument held in the opening.

12. The adaptable instrument shielding device of claim 11, further comprising:
a joint disposed on the first edge of the body, the joint having a pivot axis,
wherein the cover plate is coupled to the joint and configured to rotate about the pivot axis between a first configuration and a second configuration.

13. The adaptable instrument shielding device of claim 12, wherein the joint is disposed on the first edge on a side of the housing element opposite the cover plate.

14. The adaptable instrument shielding device of claim 12, wherein the cover plate comprises:
a tab extending from the cover plate in a direction toward the housing element, wherein the tab is configured to hold the cover plate in an open position while in the first configuration and in a closed position while in the second configuration.

15. The adaptable instrument shielding device of claim 11, wherein the housing element comprises:
a first coupling member at a first end of the body; and
a second coupling member at a second end of the body, wherein the attachment mechanism is coupled between the first and second coupling member and operable to change a distance between the first and second coupling members.

16. An adaptable instrument shielding device, comprising:

a housing element having a body and an opening along a central axis, the opening passing from a first edge of the body to a second edge of the body and adaptable to receive a plurality of different measurement instruments; and an attachment mechanism provided at least one of the first and second edge of to the housing element, the attachment mechanism configured to interface with a measurement instrument and hold the housing element to the measurement instrument via a tension fit, wherein the attachment mechanism comprises one or more protrusions on the second edge extending in a direction toward the central axis, wherein the one or more protrusions are configured to interface with a rear surface of the measurement instrument; and a cover plate attached to the housing element and configured to cover the measurement instrument held in the opening.

17. The adaptable instrument shielding device of claim 16, wherein the attachment mechanism comprises one or more protrusions on the first edge extending in a direction toward the central axis, wherein the one or more protrusions are configured to interface with a cover of the measurement instrument.

18. The protective cover of claim 6, further comprising:

a joint disposed on an edge of the body, the joint having a pivot axis, wherein the cover plate is coupled to the joint and configured to rotate about the pivot axis.

19. The protective cover of claim 18, wherein the pivot axis is at least approximately parallel to the central axis.

20. The protective cover of claim 18, wherein the pivot axis is at least approximately perpendicular to the central axis.

21. The protective cover of claim 8, further comprising:

a joint disposed on an edge of the body, the joint having a pivot axis, wherein the cover plate is coupled to the joint and configured to rotate about the pivot axis.

22. The protective cover of claim 21, wherein the pivot axis is at least approximately parallel to the central axis.

23. The protective cover of claim 21, wherein the pivot axis is at least approximately perpendicular to the central axis.

* * * * *